(12) United States Patent
Malhotra et al.

(10) Patent No.: US 10,180,947 B2
(45) Date of Patent: Jan. 15, 2019

(54) FILE-AGNOSTIC DATA DOWNLOADING IN A VIRTUAL FILE SYSTEM FOR CLOUD-BASED SHARED CONTENT

(71) Applicant: Box, Inc., Redwood City, CA (US)

(72) Inventors: Ritik Malhotra, San Jose, CA (US); Sri Sarat Ravikumar Tallamraju, Carmichael, CA (US); Tanooj Luthra, San Diego, CA (US)

(73) Assignee: Box, Inc., Redwood City, CA (US)

( * ) Notice: Subject to any disclaimer, the term of this patent is extended or adjusted under 35 U.S.C. 154(b) by 262 days.

(21) Appl. No.: 15/140,310

(22) Filed: Apr. 27, 2016

(65) Prior Publication Data

US 2016/0323358 A1 Nov. 3, 2016

Related U.S. Application Data

(60) Provisional application No. 62/154,658, filed on Apr. 29, 2015.

(51) Int. Cl.
*G06F 17/30* (2006.01)
*G06F 9/46* (2006.01)
(Continued)

(52) U.S. Cl.
CPC ......... *G06F 17/30194* (2013.01); *G06F 9/46* (2013.01); *G06F 12/0891* (2013.01); (Continued)

(58) Field of Classification Search
CPC ......... G06F 17/30194; G06F 17/30233; G06F 17/30156; G06F 17/30132; (Continued)

(56) References Cited

U.S. PATENT DOCUMENTS 6,512,529 B1 * 1/2003 Janssen ................. G06F 3/0481 715/790
6,750,858 B1 * 6/2004 Rosenstein ............. G09G 5/14 715/790

(Continued)

OTHER PUBLICATIONS

Patroumpas, Kostas, et al., "Window Specification over Data Streams", EDBT 2006 Workshops, LNCS 4254, © IFIP International Federation for Information Processing © 2006, pp. 445-464.*

(Continued)

*Primary Examiner* — Robert Stevens
(74) *Attorney, Agent, or Firm* — Vista IP Law Group, LLP

(57) ABSTRACT

A system and method for managing sizing of a plurality of sliding download windows in a virtual file system commences when a user device accesses a server in a cloud-based platform. An application on the user device issues a first file request for an object that is stored in the cloud-based platform. The virtual file system module allocates a first sliding window and prospectively downloads additional portions of the object into the first sliding window. Upon a second file request from the application, the virtual file system module allocates a second sliding window and increases the size of the first sliding window when the application requests access to the additional portions of the object that were prospectively downloaded into the first sliding window. The size of the second sliding window is decreased when a further application request for additional portions of the object hasn't been received within a time period.

20 Claims, 18 Drawing Sheets

(51) Int. Cl.
   *H04L 29/06*       (2006.01)
   *H04L 29/08*       (2006.01)
   *G06F 12/0891*     (2016.01)
   *G06F 12/122*      (2016.01)
   *H04N 19/40*       (2014.01)
   *G06F 12/1081*     (2016.01)

(52) U.S. Cl.
   CPC ........ *G06F 12/1081* (2013.01); *G06F 12/122* (2013.01); *G06F 17/30132* (2013.01); *G06F 17/30138* (2013.01); *G06F 17/30156* (2013.01); *G06F 17/30171* (2013.01); *G06F 17/30203* (2013.01); *G06F 17/30221* (2013.01); *G06F 17/30233* (2013.01); *G06F 17/30345* (2013.01); *G06F 17/30902* (2013.01); *H04L 63/0428* (2013.01); *H04L 65/602* (2013.01); *H04L 65/607* (2013.01); *H04L 65/80* (2013.01); *H04L 67/06* (2013.01); *H04L 67/1097* (2013.01); *H04L 67/34* (2013.01); *H04N 19/40* (2014.11); *G06F 2212/1016* (2013.01); *G06F 2212/1044* (2013.01); *G06F 2212/154* (2013.01); *G06F 2212/463* (2013.01); *G06F 2212/60* (2013.01); *G06F 2212/657* (2013.01)

(58) Field of Classification Search
   CPC ......... G06F 17/30221; G06F 17/30171; G06F 17/30345; G06F 17/30138; G06F 17/30203; G06F 17/30902; G06F 12/122; G06F 9/46; G06F 2212/1044; G06F 2212/154; G06F 2212/60; H04L 63/0428; H04L 67/1097; H04L 67/06; H04L 65/602; H04L 65/607; H04L 65/80; H04L 67/34; H04N 19/40
   USPC ...................................................... 707/827
   See application file for complete search history.

(56) References Cited

U.S. PATENT DOCUMENTS

| | | | |
|---|---|---|---|
| 7,047,309 B2 * | 5/2006 | Baumann | H04L 47/10 370/395.41 |
| 8,180,801 B2 * | 5/2012 | Zhang | G06F 17/30386 707/792 |
| 8,423,606 B1 | 4/2013 | Streeter | |
| 8,527,549 B2 | 9/2013 | Cidon | |
| 8,634,456 B2 | 1/2014 | Chen | |
| 8,849,761 B2 | 9/2014 | Prahlad | |
| 8,948,258 B2 | 2/2015 | Chen | |
| 9,015,470 B2 | 4/2015 | Losev | |
| 9,210,085 B2 * | 12/2015 | Harrison | H04L 47/10 |
| 9,253,166 B2 | 2/2016 | Gauda | |
| 9,288,510 B1 | 3/2016 | Yang | |
| 9,313,510 B2 | 4/2016 | Shivadas | |
| 9,319,678 B2 | 4/2016 | Coudurier | |
| 9,332,050 B2 | 5/2016 | Collard | |
| 9,384,209 B2 | 7/2016 | Kim | |
| 9,392,304 B2 | 7/2016 | Coudurier | |
| 9,444,695 B2 | 9/2016 | Dutta | |
| 9,544,348 B2 * | 1/2017 | Devereaux | H04L 67/1097 |
| 9,621,613 B1 | 4/2017 | Huang | |
| 9,628,268 B2 | 4/2017 | Kiang et al. | |
| 9,756,022 B2 | 9/2017 | Amiri et al. | |
| 9,811,532 B2 | 11/2017 | Parkison et al. | |
| 9,852,361 B1 | 12/2017 | Prasad | |
| 9,973,564 B2 | 5/2018 | Dong | |
| 2007/0076626 A1 * | 4/2007 | Wise | H04L 1/1825 370/252 |
| 2008/0098237 A1 | 4/2008 | Dung | |
| 2009/0016445 A1 | 1/2009 | Gao | |
| 2010/0211690 A1 | 8/2010 | Pakzad | |
| 2010/0268840 A1 | 10/2010 | Hiie | |
| 2010/0332479 A1 | 12/2010 | Prahlad | |
| 2011/0066668 A1 | 3/2011 | Guarraci | |
| 2011/0096828 A1 | 4/2011 | Chen | |
| 2011/0194613 A1 | 8/2011 | Chen | |
| 2011/0231519 A1 | 9/2011 | Luby | |
| 2011/0231569 A1 | 9/2011 | Luby | |
| 2011/0238789 A1 | 9/2011 | Luby | |
| 2011/0239078 A1 | 9/2011 | Luby | |
| 2011/0246616 A1 | 10/2011 | Ronca | |
| 2012/0023249 A1 | 1/2012 | Chen | |
| 2013/0013803 A1 | 1/2013 | Bichot | |
| 2013/0117418 A1 | 5/2013 | Mutton | |
| 2013/0138810 A1 | 5/2013 | Binyamin | |
| 2013/0223509 A1 | 8/2013 | Tweedale | |
| 2013/0238785 A1 | 9/2013 | Hawk | |
| 2014/0006354 A1 | 1/2014 | Parkison et al. | |
| 2014/0119457 A1 | 5/2014 | MacInnis | |
| 2014/0140417 A1 | 5/2014 | Shaffer | |
| 2014/0153909 A1 | 6/2014 | MacInnis | |
| 2014/0177733 A1 | 6/2014 | Coudurier | |
| 2014/0201141 A1 | 7/2014 | Vibhor et al. | |
| 2014/0269932 A1 | 9/2014 | Su | |
| 2014/0281009 A1 | 9/2014 | Moorthy | |
| 2014/0282771 A1 | 9/2014 | Tumuluru | |
| 2014/0324929 A1 | 10/2014 | Mason, Jr. | |
| 2014/0351455 A1 | 11/2014 | McCormick | |
| 2014/0380376 A1 | 12/2014 | Schmidt | |
| 2015/0039726 A1 | 2/2015 | Hoffert | |
| 2015/0067753 A1 | 3/2015 | Shemesh | |
| 2015/0227602 A1 | 8/2015 | Ramu | |
| 2015/0372939 A1 | 12/2015 | Redler, IV | |
| 2016/0014095 A1 | 1/2016 | Strayer | |
| 2016/0065364 A1 | 3/2016 | Amiri et al. | |
| 2016/0103851 A1 | 4/2016 | Dimitrov | |
| 2016/0119657 A1 | 4/2016 | Sun | |
| 2016/0323351 A1 | 4/2016 | Lurhra et al. | |
| 2016/0173900 A1 | 6/2016 | Lee | |
| 2016/0234282 A1 | 8/2016 | Lederer | |
| 2016/0321287 A1 | 11/2016 | Luthra et al. | |
| 2016/0321288 A1 | 11/2016 | Malhotra et al. | |
| 2016/0321291 A1 | 11/2016 | Malhotra et al. | |
| 2016/0321311 A1 | 11/2016 | Tallamraju et al. | |
| 2016/0323358 A1 | 11/2016 | Malhotra et al. | |
| 2017/0134344 A1 | 5/2017 | Wu | |
| 2017/0141921 A1 | 5/2017 | Berger | |

OTHER PUBLICATIONS

Li Jin, et al "Semantics and Evaluation Techniques for Window Aggregates in Data Streams", ACM SIGMOD 2005, Baltimore, MD, Jun. 14-16, 2005, pp. 311-322.*

Kim, Hyeon Gyu, et al., "Time-slide window join over data streams", Journal of Intelligent Information Streams, vol. 43, Issue 2, Oct. 2014, pp. 323-347.*

Patroumpas, Kostas, et al., "Maintaining consistent results of continuous queries under diverse window specifications", Information Systems, vol. 36, Issue 1, Mar. 2011, pp. 42-61.*

Li, Jin, et al "AdaptWID: An Adaptive, Memory-Efficient Window Aggregation Implementation", IEEE Internet Computing, vol. 12, Issue 6, Nov.-Dec. 2008, pp. 22-29.*

Wang, Haiyang, et al., "On the Impact of Virtualization on Dropbox-like Cloud File Storage/Synchronization Services", IWQoS'12, Coimbra, Portugal, Jun. 4-5, 2012, Article No. 11, 9 pages.

Mao, Huajian, et al., "Wukong: A cloud-oriented file service for mobile Internet devices", Journal of Parallel and Distributed Computing, vol. 72, Issue 2, Feb. 2012, pp. 171-184.

Chun, Byung-Gon, et al., "CloneCloud: Elastic Execution between Mobile Device and Cloud", EuroSys '11, Salzburg, Austria, Apr. 10-13, 2011, pp. 301-314.

Notice of Allowance dated Mar. 14, 2018 for U.S. Appl. No. 15/140,248, 10 pages.

Non-Final Office Action dated Feb. 23, 2018 for U.S. Appl. No. 15/140,292, 12 pages.

Notice of Allowance dated Feb. 21, 2018 for U.S. Appl. No. 15/140,330, 19 pages.

(56) References Cited

OTHER PUBLICATIONS

Apache Thrift Wikipedia, URL: https://en.wikipedia.org/wiki/Apache_Thrift, Oct. 27, 2015, Accessed on Jan. 26, 2016, 5 pages.
"REST Docs | Bitcasa Developer Center", URL: https://developer.bitcasa.com/docs/rest/, Sep. 2015, Accessed on Jan. 15, 2016, 188 pages.
"Data deduplication", Wikipedia, URL: https://en.wikipedia.org/wiki/Data_deduplication, Mar. 6, 2016, Accessed on Apr. 10, 2016, 7 pages.
Final Office Action dated Aug. 1, 2018 for U.S. Appl. No. 15/140,292 25 pages.
Notice of Allowance dated Jun. 15, 2018 for U.S. Appl. No. 15/140,179 23 pages.
Office Action dated Nov. 9, 2018 for U.S. Appl. No. 15/140,357 Non-Final, 24 pages.
Final Office Action dated Oct. 30, 2018 for U.S. Appl. No. 15/140,270 22 pages.

\* cited by examiner

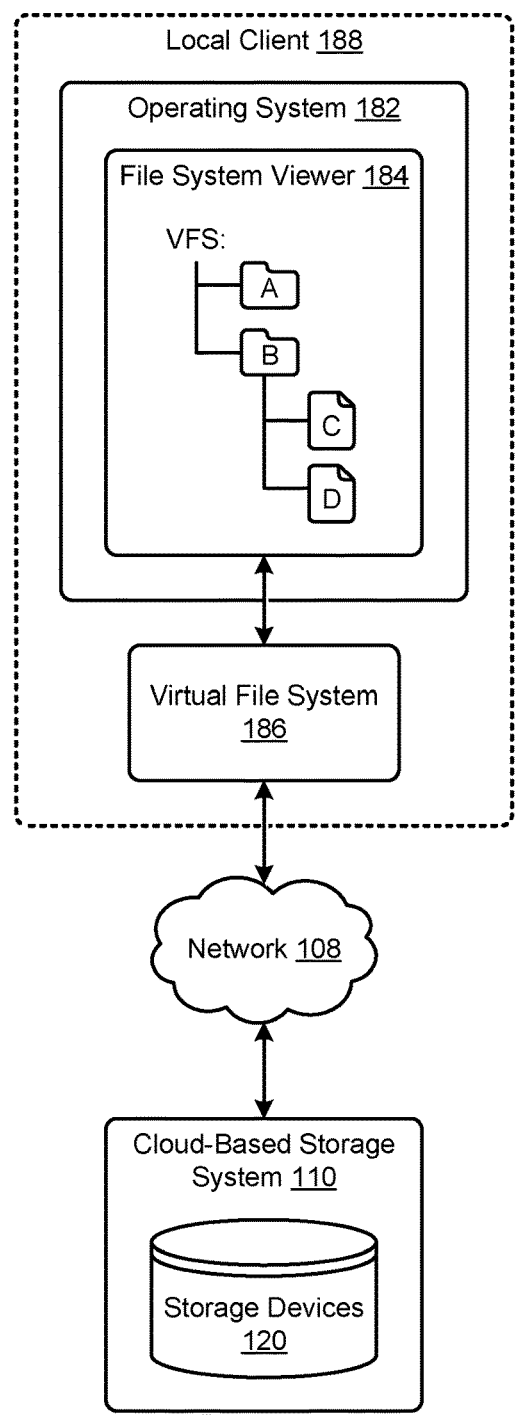
FIG. 1A1

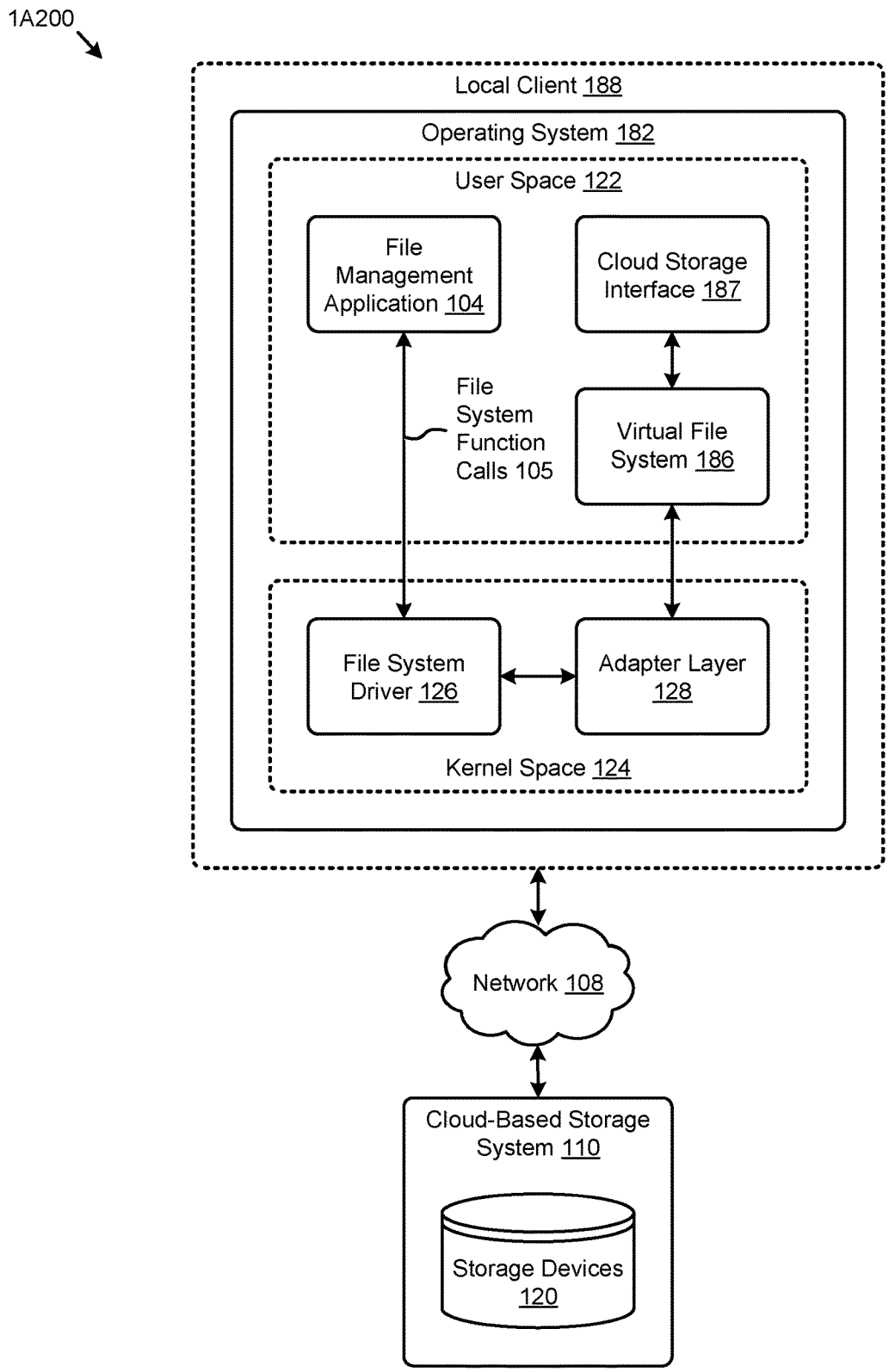
FIG. 1A2

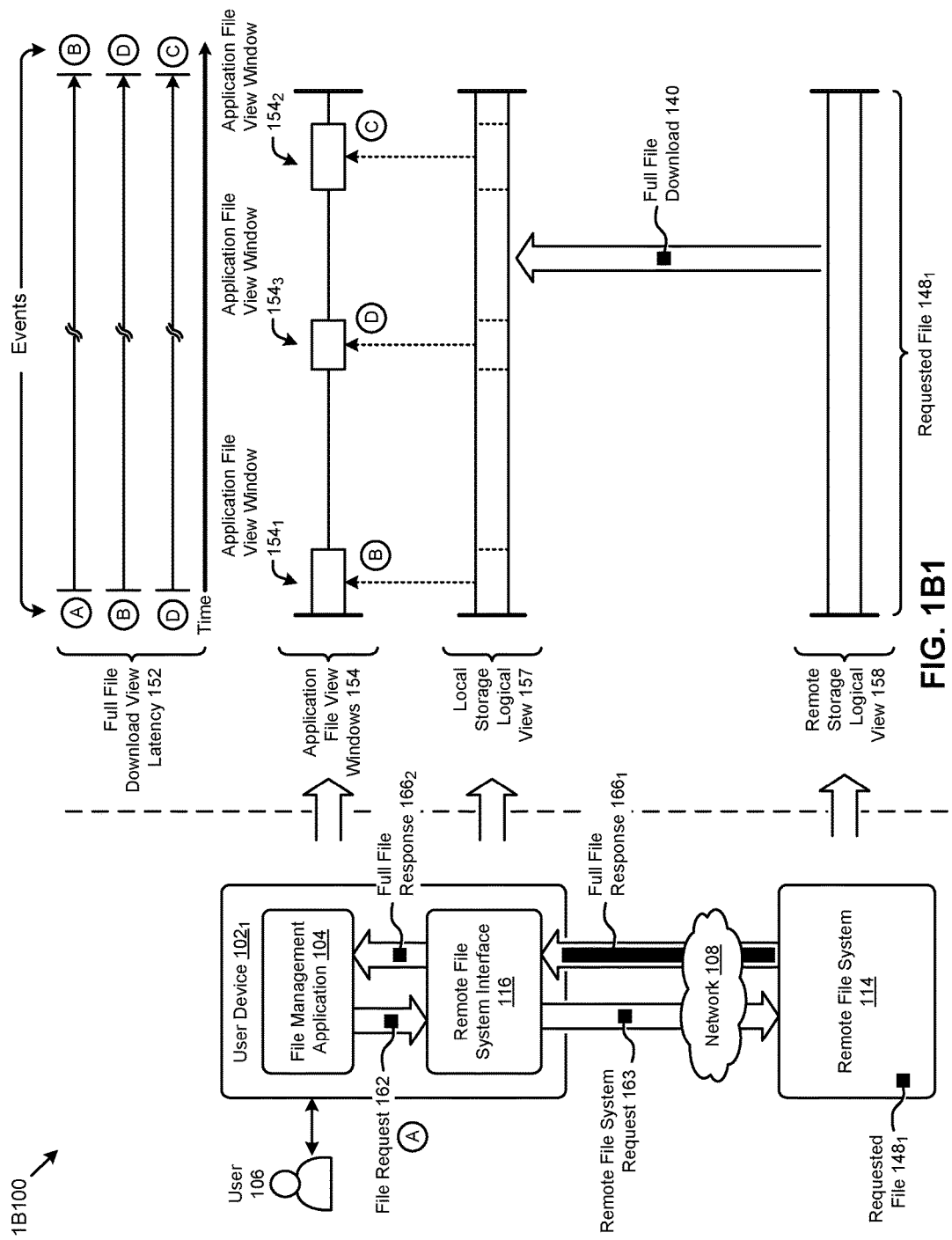
FIG. 1B1

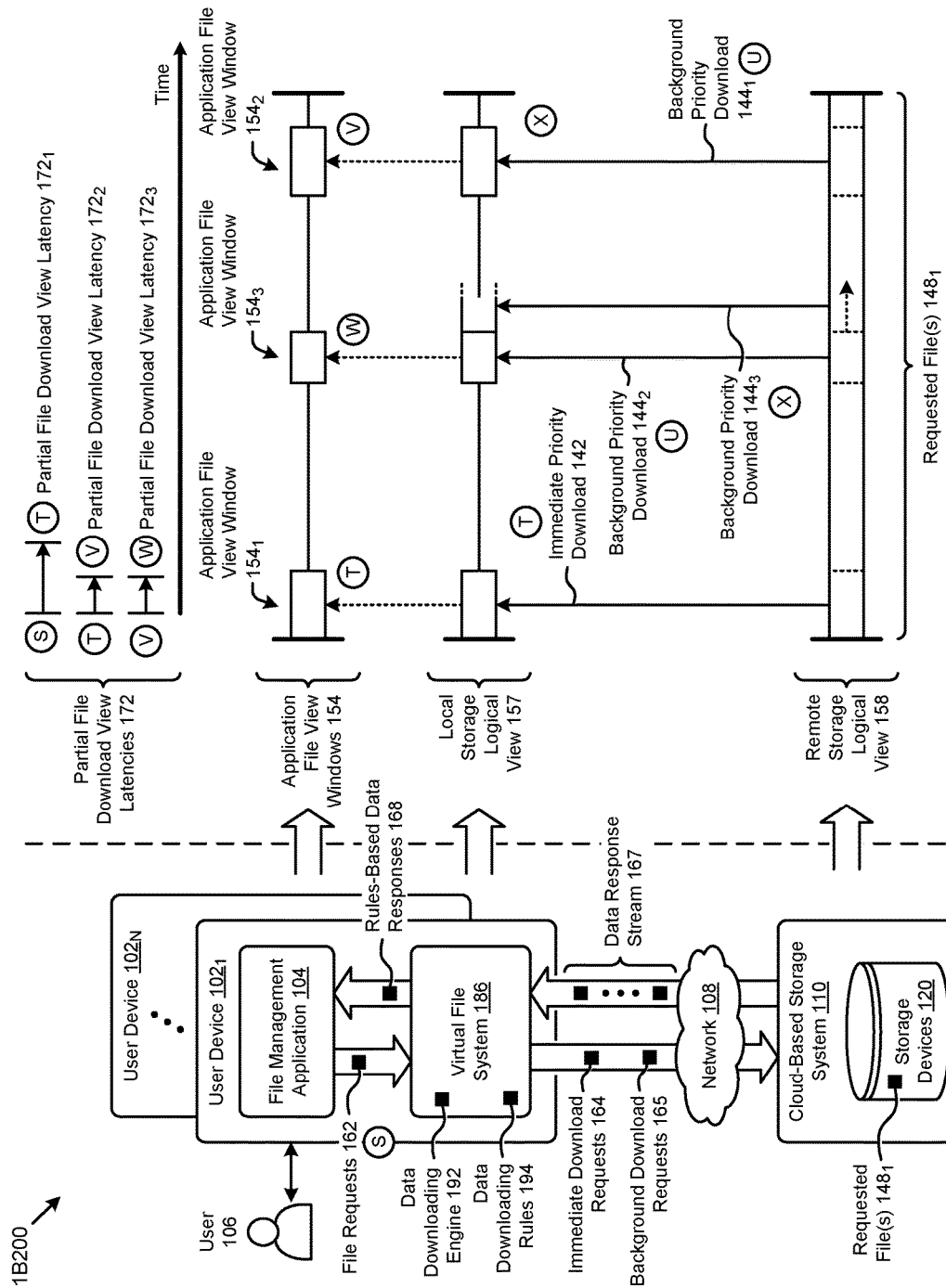
FIG. 1B2

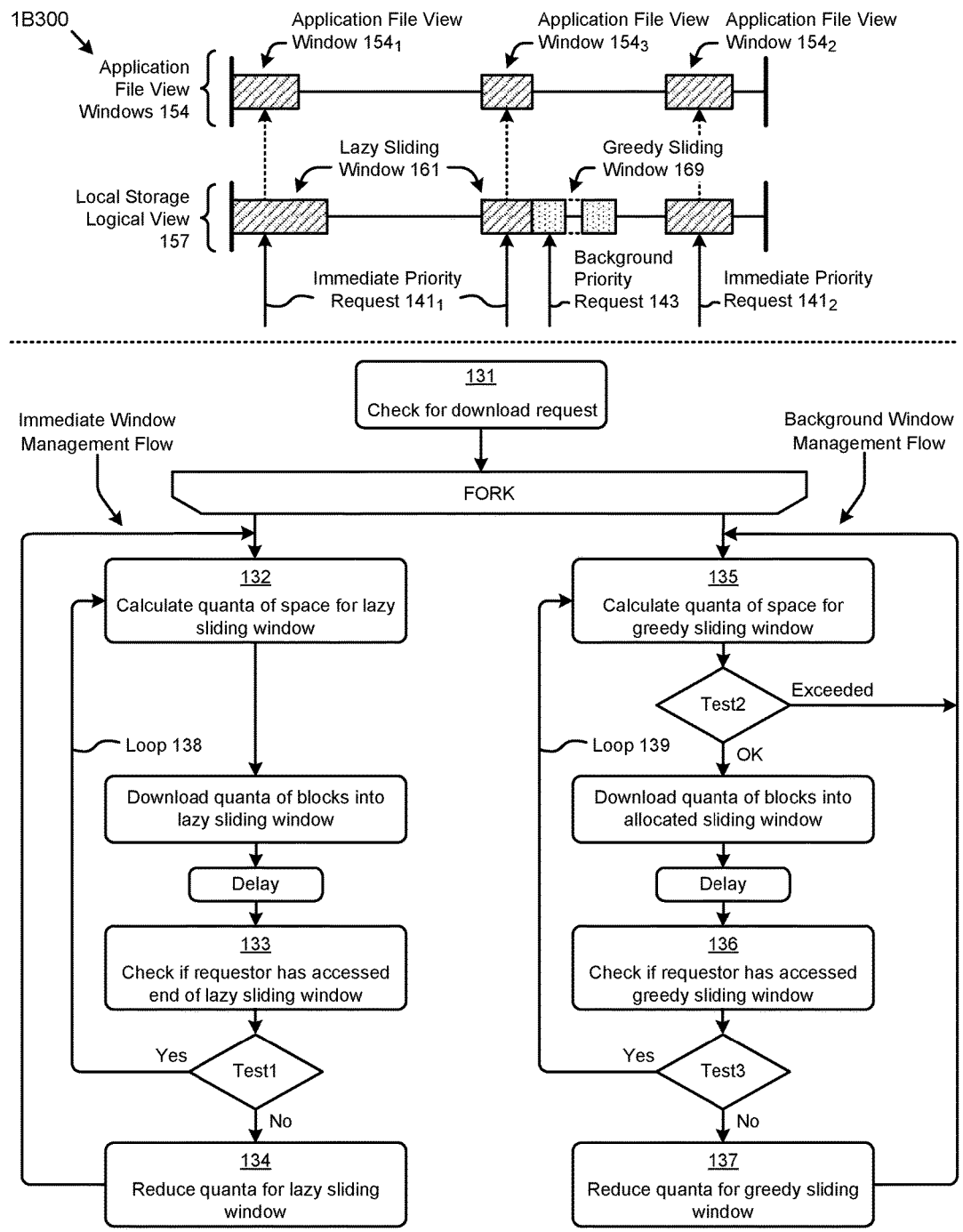
FIG. 1B3

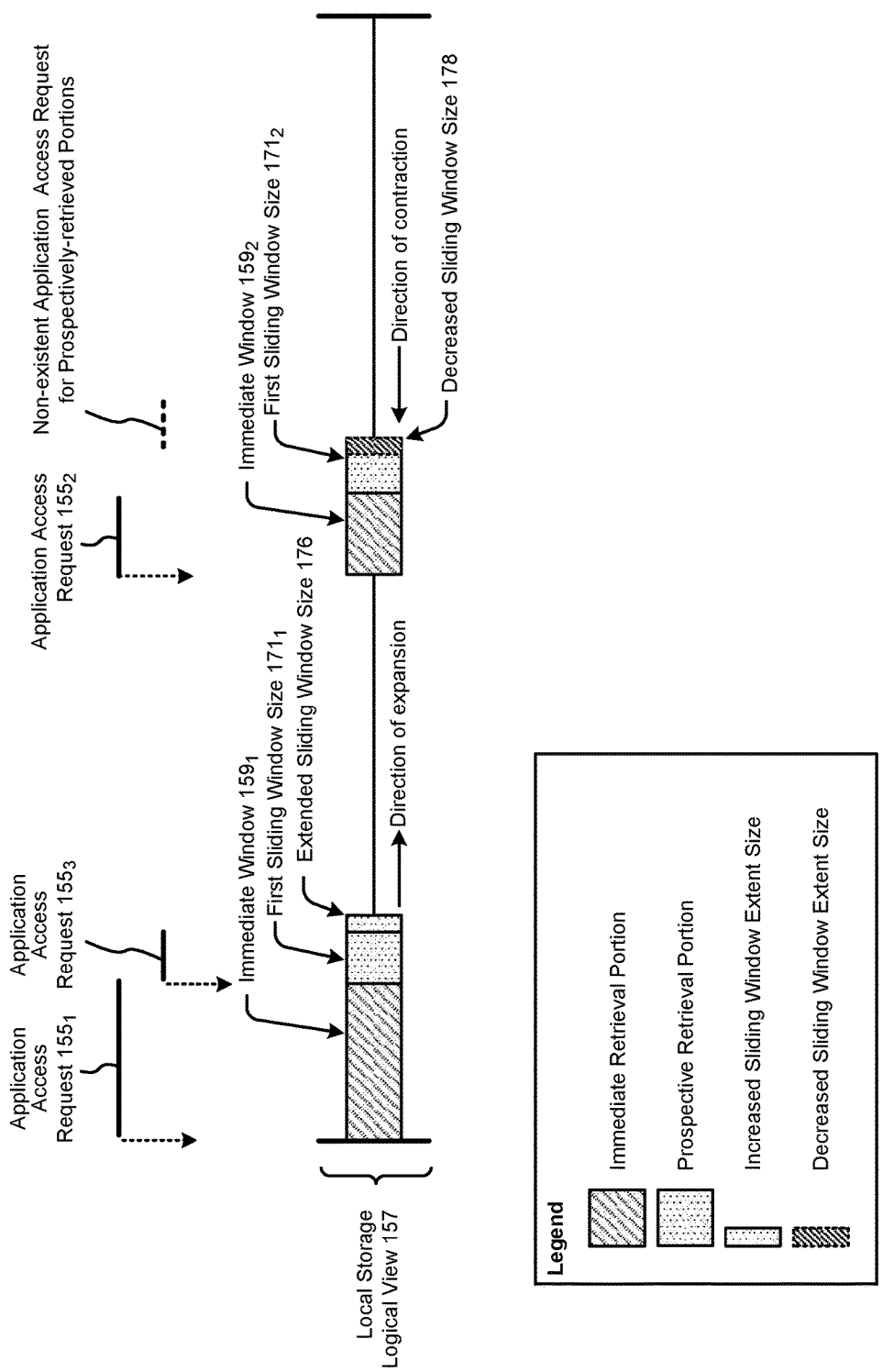
FIG. 1B4

FILE-AGNOSTIC DATA DOWNLOADING IN A VIRTUAL FILE SYSTEM FOR CLOUD-BASED SHARED CONTENT

RELATED APPLICATIONS

The present application claims the benefit of priority to U.S. Provisional Patent Application Ser. No. 62/154,658 titled, "METHOD MECHANISM TO IMPLEMENT A VIRTUAL FILE SYSTEM FROM REMOTE CLOUD STORAGE", filed Apr. 29, 2015, which is hereby incorporated by reference in its entirety The present application is related to co-pending U.S. Patent Application titled, "A VIRTUAL FILE SYSTEM FOR CLOUD-BASED SHARED CONTENT" filed on even date herewith; and the present application is related to co-pending U.S. Patent Application titled, "OPERATION MAPPING IN A VIRTUAL FILE SYSTEM FOR CLOUD-BASED SHARED CONTENT" filed on even date herewith; and the present application is related to co-pending U.S. Patent Application titled, "MULTI-REGIME CACHING IN A VIRTUAL FILE SYSTEM FOR CLOUD-BASED SHARED CONTENT" filed on even date herewith; and the present application is related to co-pending U.S. Patent Application titled, "FILE TREE STREAMING IN A VIRTUAL FILE SYSTEM FOR CLOUD-BASED SHARED CONTENT" filed on even date herewith; and the present application is related to co-pending U.S. Patent Application titled, "SECURE CLOUD-BASED SHARED CONTENT" filed on even date herewith; all of which are hereby incorporated by reference in their entirety.

FIELD

This disclosure relates to managing content in a cloud-based service platform, and more particularly to techniques for managing multiple resizable download range windows when performing file-agnostic data downloading from a cloud-based file repository.

BACKGROUND

The proliferation of cloud based services and platforms continues to increase. Specifically, cloud-based content management services and platforms have impacted the way personal and corporate electronically stored information objects (e.g., files, images, videos, etc.) are stored, and has also impacted the way such personal and corporate content is shared and managed. One benefit of using such cloud-based platforms is the ability to securely share large volumes of content among trusted collaborators on a variety of user devices such as mobile phones, tablets, laptop computers, desktop computers, and/or other devices. For example, a large enterprise with thousands of users (e.g., employees) and many terabytes of content might use a cloud-based content storage platform to efficiently and securely facilitate content access to various individual users and/or collaborative groups of users. In such cases, a user can access a large volume of objects stored in the cloud-based platform from a user device that might store merely a small portion of that volume locally. Such access can enable multiple users (e.g., collaborators) to manage certain shared objects for various collaborative purposes (e.g., co-development, audience presentation, etc.). Specifically, users can manage (e.g., create, view, edit, execute, etc.) the shared objects using various applications operating on a user device. For example, multiple users might collaborate on the development of a certain design document (e.g., design101.pdf) using a respective instance of an application (e.g., Adobe Acrobat) operating on a respective user device. In some cases, such collaborative documents and/or other objects stored in the cloud-based content storage platform can be large.

Unfortunately, legacy techniques for presenting a local device representation of a shared content object stored on a cloud-based storage system can be limited at least as pertaining to latencies associated with presenting the shared content object locally to the user. More specifically, certain legacy approaches might process a request to open a certain file stored on a cloud-based storage system on a local user device by downloading the full file to local device memory before presenting it to the user for interaction (e.g., viewing, editing, etc.). In such cases, the delay experienced by the user before having access to the requested file can be significant. Such delays can be increased when network download speeds are degraded due to certain network conditions. Further, even in cases when the user might desire to access merely a small portion of the requested file, the full file will nonetheless be downloaded to the local memory, wasting costly network bandwidth and wastefully consuming local storage space. Moreover, for large files, consumption of local device storage space can degrade the performance of the local device and/or, in some cases, can raise an error when opening the requested file. Some legacy approaches might facilitate partial downloading of objects having a certain known structure. For example, a video file composed using a standard format (e.g., MPEG-4, AVI, etc.) can be partially downloaded for interaction (e.g., viewing) using various information (e.g., metadata, playlist file, etc.) and/or protocols (e.g., built in to the viewing application) specific to the format. As another example, certain legacy approaches enable the viewing of file previews (e.g., photo thumbnails, index thumbnails, etc.) for a given application and/or file type (e.g., photos, PDF files, etc.). The foregoing legacy approaches, however, are limited at least in that partial downloading techniques rely on knowledge of the file layout and/or on preconditions that might not always be present during the downloading processes, particularly across the many various object types that might comprise the shared content of a cloud-based storage system.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for file-agnostic data downloading in a virtual file system for a cloud-based environment, which techniques advance the relevant technologies to address technological issues with legacy approaches. More specifically, the present disclosure provides a detailed description of techniques used in systems, methods, and in computer program products for file-agnostic data downloading in a virtual file system for a highly collaborative cloud-based environment. Certain embodiments are directed to technological solutions for implementing a virtual file system (VFS) on a local device to facilitate rules-based file-agnostic data downloading from a cloud-based storage system, which embodiments advance the relevant technical fields as well as advancing peripheral technical fields. The disclosed embodiments modify and improve over legacy approaches. In particular, the herein-disclosed techniques provide technical solutions that address the technical problems attendant to low latency local access to widely varying shared content objects stored on a cloud-based storage system.

Such technical solutions serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to distributed storage.

Further details of aspects, objectives, and advantages of the technological embodiments are described herein and in the following descriptions, drawings and claims.

BRIEF DESCRIPTION OF THE DRAWINGS

The drawings described below are for illustration purposes only. The drawings are not intended to limit the scope of the present disclosure.

FIG. 1A1 illustrates a logical system view of a virtual file system for cloud-based shared content, according to some embodiments.

FIG. 1A2 depicts a framework for implementing a virtual file system for cloud-based shared content, according to some embodiments.

FIG. 1B1 presents a full file download technique.

FIG. 1B2 presents a partial file download technique facilitated by a virtual file system in a highly collaborative cloud-based environment, according to some embodiments.

FIG. 1B3 depicts a sliding window technique for managing sizing and prioritization of a plurality of download windows as facilitated by a virtual file system in a highly collaborative cloud-based environment, according to some embodiments.

FIG. 1B4 depicts a sliding window example for managing sizing and prioritization of a plurality of download windows as facilitated by a virtual file system in a highly collaborative cloud-based environment, according to some embodiments.

FIG. 2 presents an interconnection diagram showing communications between system components that cooperate to implement file-agnostic data downloading in a virtual file system, according to an embodiment.

FIG. 3 is a block diagram showing interactions with components of a virtual file system to facilitate file-agnostic data downloading in a highly collaborative cloud-based environment, according to an embodiment.

FIG. 4 presents a rules-based data downloading technique facilitated by a virtual file system in a highly collaborative cloud-based environment, according to an embodiment.

DETAILED DESCRIPTION

Figure 2:
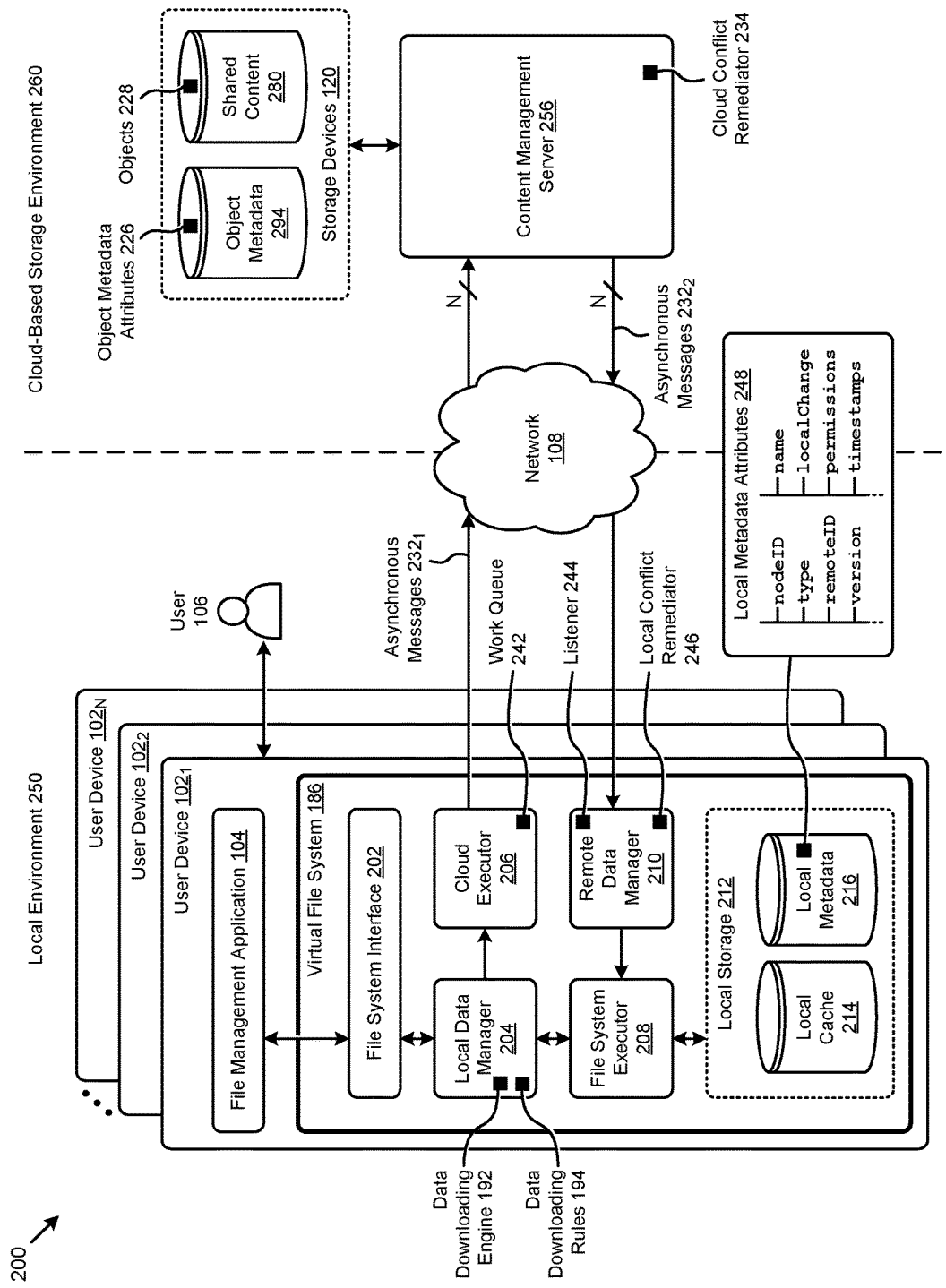

Some embodiments of the present disclosure address the problem of low latency local access to widely varying shared content objects stored on a cloud-based storage system and some embodiments are directed to approaches for implementing a virtual file system (VFS) on a local device, which virtual file system facilitates rules-based, file-agnostic data downloading from a cloud-based storage system. The accompanying figures and discussions herein present example environments, systems, methods, and computer program products.

Overview

Disclosed herein are techniques that implement a virtual file system (VFS) on a local device to facilitate rules-based file-agnostic data downloading from a cloud-based storage system. Specifically, in some embodiments, a data downloading engine in the VFS can receive a certain set of file view requests from an application on a local user device. The data downloading engine serves to generate various immediate download operations and/or background download operations that download (e.g., in an interruptible data response stream) portions (e.g., data block regions) of a shared content object from the cloud-based storage system to the local device. In certain embodiments, the immediate download operations and/or the background download operations can be determined based in part on the result of applying a set of rules to various parameters and/or measurements pertaining to the file view requests. In other embodiments, a message can be delivered to the application to close or otherwise interrupt a file view request so as to facilitate user access to just certain portions of a file without the full file being downloaded locally.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims. Cl Descriptions of Example Embodiments FIG. 1A1 illustrates a logical system view 1A100 of a virtual file system for cloud-based shared content. As an option, one or more variations of logical system view 1A100 or any aspect thereof may be implemented in the context of the architecture and functionality of the embodiments described herein. The logical system view 1A100 or any aspect thereof may be implemented in any environment.

As shown, the logical system view 1A100 comprises a local client 188 such as a user device (e.g., smart phone, laptop, etc.) that can have an operating system 182 that supports the operation of various applications such as a file system viewer 184. In some cases, the file system viewer 184 might comprise a portion of a given application (e.g., an explorer to open an application file). As shown, the file system viewer 184 might render a visual representation of the certain objects such as directories (e.g., folder A, folder B, etc.) and/or files (e.g., file C, file D, etc.), accessible at the local client 188. However, some or all of the objects (e.g., directories, files, etc.) accessible and/or visible within the file system viewer 184 might not be managed by the operating system 182.

In some cases, the primary storage for such objects might be implemented across a network 108 by a cloud-based storage system 110. For example, certain instances of the cloud-based storage system 110 can be embodied as a cloud-based and/or SaaS-based storage management architecture having one or more instances of storage devices 120. The storage devices 120 can comprise any combination of hardware and software that can provide access to the data (e.g., content, objects, etc.) stored on the storage devices 120. For example, the storage devices 120 might be implemented as computer memory operatively managed by an operating system (OS), hard disk drives, solid-state drives, networked attached storage, storage area networks, cloud-based storage, and/or any other type of storage facility and/or architecture that is capable of storing data. The data in the storage devices 120 can be implemented as any type of data objects and/or files.

The cloud-based storage system 110 can serve as the primary storage for certain objects accessible by the local client 188. Moreover, the cloud-based storage system 110 can be situated on a hosted platform. Further, the cloud-based storage system 110 can provide storage services to multiple users and/or scale to service any number of users.

According to the herein disclosed techniques, a virtual file system 186 can be delivered to the local client 188 to facilitate access to objects stored at the cloud-based storage system 110. In some embodiments, the virtual file system 186 can be implemented as a virtual file system module. As described herein, the virtual file system 186 can address the problems attendant to low latency local access (e.g., at the local client 188) to widely varying shared content objects stored on the cloud-based storage system 110. As an example, the virtual file system 186 implementing the herein disclosed techniques can facilitate rules-based file-agnostic data downloading of shared content stored on the cloud-based storage system 110. One embodiment of a framework for implementing instances of the virtual file system 186 is described in FIG. 1A2.

FIG. 1A2 depicts a framework 1A200 for implementing a virtual file system for cloud-based shared content. As an option, one or more variations of framework 1A200 or any aspect thereof may be implemented in the context of the architecture and functionality of the embodiments described herein. The framework 1A200 or any aspect thereof may be implemented in any environment.

Specifically, the embodiment shown in framework 1A200 depicts the local client 188 and the operating system 182 earlier described in FIG. 1A1. The framework 1A200 further illustrates various components included in the operating system 182 (e.g., virtual file system 186) that can facilitate access, through the network 108, to the data objects and/or files from the storage devices 120 of the cloud-based storage system 110. More specifically, the operating system 182 is shown to include a user space 122 and a kernel space 124 comprising various components and/or modules. For example, the user space 122 can include a file management application 104 that may be used to access files from a file system. The file management application 104 can comprise any native application that may exist in the user space 122 such as application programs and/or system utilities. In some cases, certain applications from the kernel space 124 may also be used to access files within the file system. The file management application 104 may issue various instances of file system function calls 105 to access the file system. For example, the file management application 104 might comprise a system library having a function to access a file and/or directory within the file system. Any suitable call can be issued by the file management application 104 such as calls to perform read, write, modify, and/or other operations. The file system function calls 105 can be directed to a file system driver 126 within the kernel space 124. In some cases, the file system driver 126 can be implemented as a virtual file system driver.

In some embodiments, the file system driver 126 can interface with an adapter layer 128 in the kernel space 124 to redirect the calls to the virtual file system 186 in the user space 122. In some cases, the adapter layer 128 can be implemented as a kernel extension to the kernel space 124. Any suitable embodiment of the adapter layer 128 can be implemented to facilitate the herein disclosed techniques. For example, in a Mac OS implementation of the operating system 182, the OSXFUSE kernel extension can be implemented as the adapter layer 128. In this case, the OSXFUSE application programming interface (API), user space libraries, and/or other tools can enable an extension of the Mac OS native file handling capabilities (e.g., for third party use).

More specifically, according to the herein disclosed techniques, the adapter layer 128 can receive a representation of the file system function calls 105 from the file system driver 126 for redirection (e.g., from the natively supported file system) to the virtual file system 186. The virtual file system 186 can handle the calls by using a cloud storage interface 187 to access the requested files at the cloud-based storage system 110. For example, such access can be facilitated by calling an API associated with the cloud-based storage system 110. In some embodiments, the virtual file system 186 may include a local cache to provide a low latency response to calls pertaining to files and/or portions of files previously requested and stored in the local cache.

In some cases, however, legacy approaches using such local caches and/or other techniques to present a local device representation (e.g., at local client 188) of a shared content object stored on a cloud-based storage system (e.g., cloud-based storage system 110) can be limited at least as pertaining to latencies associated with presenting the shared content object locally to a user. One example of such legacy approaches is described in FIG. 1B1.

FIG. 1B1 presents a full file download technique 1B 100. As an option, one or more variations of full file download technique 1B 100 or any aspect thereof may be implemented in the context of the architecture and functionality of the embodiments described herein. The full file download technique 1B 100 or any aspect thereof may be implemented in any environment.

The full file download technique 1B 100 illustrates certain problems with legacy approaches attendant to low latency local access to widely varying shared content objects stored on a cloud-based storage system. Specifically, as shown, a remote file system interface 116 can be provided to a user device 102$_1$ operated by a user 106 to facilitate access to a remote file system 114 over the network 108. More specifically, a file management application 104 can interact with the remote file system interface 116 to request access to a requested file 148$_1$ stored at the remote file system 114. Specifically, as an example, the remote storage space allocated to the requested file 148$_1$ at the remote file system 114 can be represented as shown in a remote storage logical view 158. The file management application 104 can issue a file request 162 to the remote file system interface 116 that can be forwarded as a remote file system request 163 to facilitate management (e.g., viewing, editing, sharing, etc.) of the requested file 148$_1$ in the file management application 104. For example, the file request 162 might pertain to opening a large design specification document in the file management application 104 for collaborative purposes. The file request 162 might further specify a beginning portion of the requested file 148$_1$ is to be viewed first (as represented by an application file view window 154$_1$ in the application file view windows 154).

According to certain legacy approaches, the file request 162 might be processed by the remote file system interface 116 such that the remote file system request 163 to the remote file system 114 generates a full file response 166$_1$ from the remote file system 114 that is forwarded by the remote file system interface 116 to the file management application 104 (e.g., full file response 166$_2$). With such legacy approaches, the full file response 166$_1$ can correspond to a full file download 140 of the requested file 148$_1$ to the user device 102$_1$. In such cases, the local storage space for the requested file 148$_1$ as shown in a local storage logical view 157 is near equivalent to the remote storage space for the requested file shown in the remote storage logical view 158.

While the remote storage space may be a small portion of the available storage space at the remote file system 114, the local storage space for the requested file might comprise a significant portion of the available space at the user device 102$_1$ (e.g., a mobile phone). Further, the latency or time delay from the moment in time the file request 162 is issued (see time A) to the moment in time the application file view window 154$_1$ is presented to the user 106 (see time B) can be long, at least as pertaining to certain responsiveness expectations and/or metrics (e.g., from the perspective of the user 106). Such a long latency is depicted in a full file download view latency 152.

Other file views corresponding to other respective portions (e.g., page ranges) of the requested file 148$_1$ might be invoked by the user 106. As shown here, any portion of the file requested by the user would incur the full file download view latency 152. Further, the full file download 140 associated with the foregoing full file download approaches can consume costly network bandwidth when only certain portions (e.g., application file view windows 154) of the requested file 148$_1$ are desired to be viewed.

In some cases, certain legacy approaches might facilitate partial downloading of the requested file 148$_1$ when the requested file 148$_1$ comprises a known and consistent structure (e.g., standard formatted media files). Such approaches often rely on knowledge of the file layout and/or on preconditions that might not always be available or present during the downloading process, particularly across the various object types that might comprise the shared content of the remote file system 114.

Such issues with legacy approaches can be addressed by the herein disclosed techniques for file-agnostic data downloading in a virtual file system for a highly collaborative cloud-based environment as described in FIG. 1B2.

FIG. 1B2 presents a partial file download technique 1B200 facilitated by a virtual file system in a highly collaborative cloud-based environment. As an option, one or more variations of partial file data downloading technique 1B200 or any aspect thereof may be implemented in the context of the architecture and functionality of the embodiments described herein. The partial file data downloading technique 1B200 or any aspect thereof may be implemented in any environment.

The partial file data downloading technique 1B200 depicts a technique enabled by the herein disclosed techniques for rules-based file-agnostic data downloading from a cloud-based storage system. Specifically, in one or more embodiments, instances of a virtual file system module (e.g., virtual file system 186, etc.) can be delivered to various user devices (e.g., user device 102$_1$, . . . , user device 102$_N$) associated with respective users, such as user 106, to provide a set of rules-based data responses 168 to a set of file requests 162 from one or more applications represented by the file management application 104. For example, the virtual file system 186 might receive various instances of the file requests 162 issued from the file management application 104 to access certain objects (e.g., requested files) stored in the storage devices 120 of the cloud-based storage system 110.

In some embodiments, a data downloading engine 192 and a set of data downloading rules 194 at the virtual file system 186 can facilitate the processing of the file requests 162 to dispatch instances of immediate download requests 164 and/or instances of background download requests 165. The cloud-based storage system 110 can respond to the immediate download requests 164 and/or the background download requests 165 to produce a data response stream 167 received by the virtual file system 186. In some embodiments, as illustrated, the data response stream 167 can comprise a collection of various portions (e.g., data blocks) of the requested files based on the attributes characterizing the immediate download requests 164 and/or the background download requests 165. In certain embodiments, such attributes characterizing the immediate download requests 164 and/or the background download requests 165 can be based at least in part on the data downloading rules 194.

More specifically, for example, one or more instances of the file requests 162 might call for access to a requested file $148_1$ from the cloud-based storage system 110. As shown, the remote storage space allocated to the requested file $148_1$ at the storage devices 120 of the cloud-based storage system 110 can be represented as shown in a remote storage logical view 158. The file requests 162 pertaining to the requested file $148_1$ received at the virtual file system 186 might be processed at least in part by the data downloading engine 192 to generate an instance of the immediate download requests 164 corresponding to an immediate priority download 142. For example, the file requests 162 issued from the file management application 104 might have indicated that a beginning portion of the requested file $148_1$ is to be first viewed at file open. Specifically, certain file request parameters characterizing the file requests 162 might indicate a data block offset and a data block length or range to be viewed at file open. Such a beginning portion of the requested file $148_1$ can be represented by an application file view window $154_1$ in the application file view windows 154.

As shown, according to the herein disclosed techniques, the immediate priority download 142 merely downloads the beginning portion specified in the file requests 162 as indicated in the local storage logical view 157. Such selective data downloading facilitated by the herein disclosed techniques can allocate a minimum portion of the local cache that might be required according to a given instance of the file requests 162, allowing a remaining portion of the local cache to be used for other purposes. Further, the latency or time delay from the moment in time the file requests 162 are issued (see time S) to the moment in time the application file view window $154_1$ is presented to the user 106 (see time T) can be short, at least as pertaining to certain responsiveness expectations and/or metrics (e.g., from the perspective of the user 106). Such a low latency is depicted in a partial file download view latency $172_1$ included in a set of partial file download view latencies 172. As disclosed herein, the application is served the first blocks from respective file requests 162 and, during the application's processing of the first blocks, the blocks beyond the beginning portion are retrieved in the background. As such, the application may encounter no latency even when processing the blocks beyond the beginning portion.

As further enabled by the herein disclosed techniques, the data downloading engine 192 might generate various instances of the background download requests 165 corresponding to a background priority download $144_1$ and/or a background priority download $144_2$, such as is shown in FIG. 1B2. For example, such background priority downloads might correspond to data the user is expected to request based on various information. In some cases, the background priority downloads can sometimes be referred to as "buffer" priority downloads or "eager" downloads. Further, such background priority downloads might be characterized by a processing priority that is below a processing priority of the immediate priority download 142. In such cases, the background priority downloads might be processed at a moment in time (see time U) that is later than the moment in time (see time T) the immediate priority downloads are processed.

Further, the background priority downloads can be generated based on certain parameters derived from applying various information (e.g., file request parameters, system performance parameters, etc.) to the data downloading rules 194. For example, the portion of the requested file $148_1$ corresponding to the background priority download $144_1$ might be derived from information indicating a recent collaborative edit on the requested file $148_1$. As another example, the portion of the requested file $148_1$ corresponding to the background priority download $144_2$ might be derived from information indicating a last edit of the requested file $148_1$ performed by the user 106. In such cases, a low latency access to the foregoing portions of the requested file $148_1$ downloaded to the local cache responsive to the background priority downloads can be provided. Specifically, for example, the application file view window $154_2$ might be requested at time V, and the application file view window $154_3$ might be requested at time W. In such cases, the latencies (e.g., partial file download view latency $172_2$ and partial file download view latency $172_3$, respectively) from the moment in time of the file view request to the moment in time of the respective presented file view can be short, at least as pertaining to certain responsiveness expectations and/or metrics (e.g., from the perspective of the user 106).

As shown, further instances of the background download requests 165 can be issued by the virtual file system 186. For example, an instance of the background download requests 165 corresponding to the background priority download $144_3$ might be issued (see time X). Specifically, the background priority download $144_3$ can continually download additional data blocks logically adjacent to current and/or last view (e.g., application file view window $154_3$) requested by the user 106. In some cases, a local storage reallocation can be performed to allocate local cache space for further data downloads (e.g., background priority download $144_3$) requested by the virtual file system 186 (see time X). Further, the techniques disclosed in FIG. 1B2 and/or herein can be file-agnostic, at least in that such techniques can be applied to any data object in the cloud-based storage system 110 accessible by the virtual file system 186. Specifically, the herein disclosed techniques can be applied when the layout, structure, and/or any other preconditions associated with the requested file $148_1$ are not known when the file requests 162 are issued.

Figure 3:
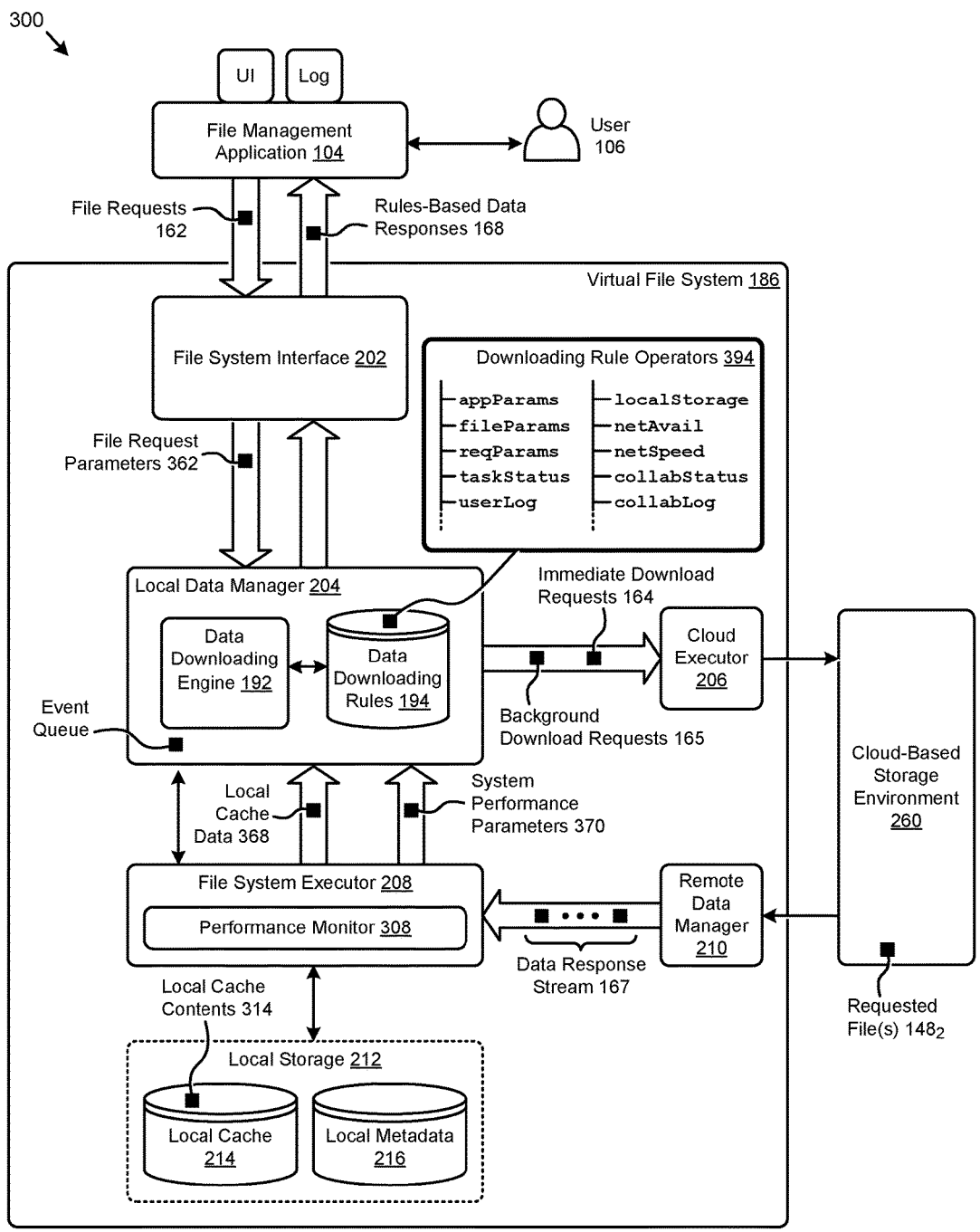

FIG. 1B3 depicts a sliding window technique 1B300 for managing sizing and prioritization of a plurality of download windows as facilitated by a virtual file system in a highly collaborative cloud-based environment.

The shown technique involves concurrent and independent services that implement two types of sliding windows: (1) a lazy sliding window 161 to service immediate priority requests (e.g., immediate priority requests $141_1$, immediate priority requests $141_2$) and, (2) a greedy sliding window 169 to service background priority requests (e.g., background priority request 143). The shown flow commences with a check for a download request (e.g., at step 131).

When a download request is processed, the immediate window management flow calculates a quanta of space for a lazy sliding window 161 (at step 132) and immediately commences to download a lazy sliding window quanta of blocks into a lazy sliding window area. After a delay, the immediate window management flow checks if the requestor had accessed the end of the lazy sliding window (at step 133). A variety of tests are carried out (at Test1) to determine if the lazy sliding window quanta for the lazy sliding window is right-sized (e.g., the requestor accessed the requested data), or if the lazy sliding window quanta for the lazy sliding window is larger than is being used by the requestor. In some cases even a relatively small lazy sliding window quanta is larger than is used by the requestor. In other cases even a relatively large lazy sliding window quanta is smaller than is used by the requestor. Accordingly, when the "Yes" branch of Test1 is taken, then the immediate window management flow takes loop 138 to calculate a new lazy sliding window quanta based on the then-current conditions. When the "No" branch of Test1 is taken, even the relatively small lazy sliding window quanta is deemed as being larger than is used by the requestor, and the lazy sliding window quanta is reduced (at step 134).

An initial quanta for an extent can be calculated to be right-sized based on network conditions, rate of consumption, a padding factor to adjust for varying network conditions, the size of the file or object under consideration, and other factors (e.g., see EQ. 1). The extent can be adjusted dynamically. For example, if the network conditions improve, more data can be prospectively downloaded or, if network conditions had been observed so as to know to a statistical certainty of variations in network speeds, then the padding factor can be adjusted (e.g., to be increased or to be decreased).

$$\text{Initial\_Quanta}=f(\text{network conditions,padding factor,} \\ \text{size of subject file,consumption rate}) \qquad [\text{EQ.1}]$$

As earlier indicated, the services check for a download request (e.g., at step 131). When a download request is found, the background window management flow calculates a greedy sliding window quanta of space for a greedy sliding window 169 (at step 135) and if the size of the greedy sliding window has not yet exceeded a threshold (at Test2), then the background window management flow commences to download a greedy sliding window quanta of blocks into a greedy sliding window area. After a delay, the background window management checks if the requestor had accessed the beginning of the greedy sliding window (at step 136). A variety of tests are carried out (at Test3) to determine if the greedy sliding window quanta for the greedy sliding window is right-sized (e.g., the requestor accessed the requested data), or if the greedy sliding window quanta for the greedy sliding window is larger than is being used by the requestor. In some cases even a relatively small greedy sliding window quanta is larger than is used by the requestor. In other cases even a relatively large greedy sliding window quanta is smaller than is used by the requestor. Accordingly, when the "Yes" branch of Test3 is taken, then the background window management flow takes loop 139 to calculate a new greedy sliding window quanta based on the then-current conditions. When the "No" branch of Test3 is taken, then even the relatively small greedy sliding window quanta is deemed as being larger than is used by the requestor, and the greedy sliding window quanta is reduced (at step 137).

Figure 4:
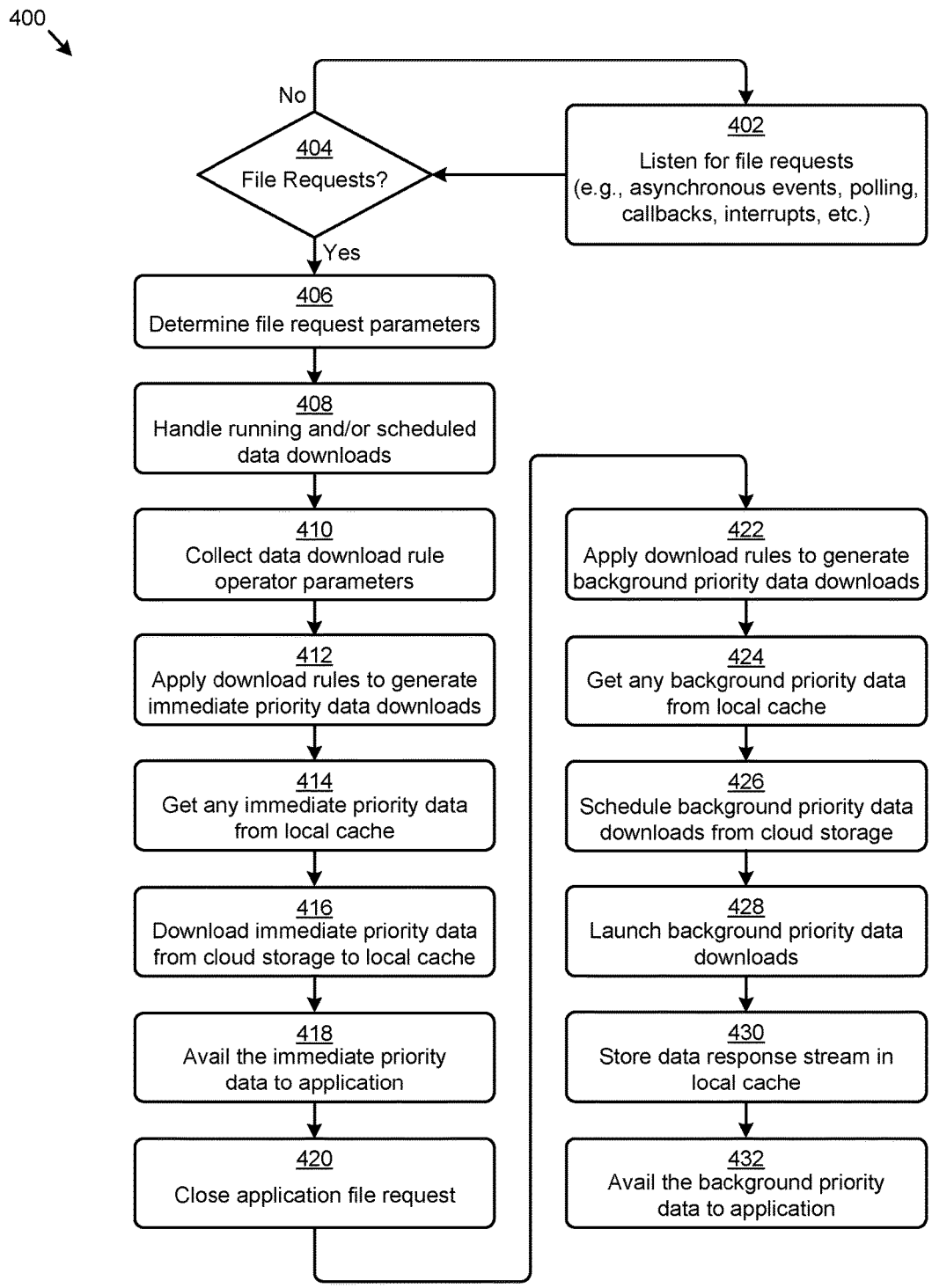

FIG. 1B4 depicts a sliding window example for managing sizing and prioritization of a plurality of download windows as facilitated by a virtual file system in a highly collaborative cloud-based environment.

An application interfaces with a virtual file system module and issues a first file request (e.g., application access request $155_1$). The virtual file system allocates an immediate window $159_1$ as well as a first sliding window extent (e.g., a first sliding window size $171_1$) based on a default size of a prospective retrieval window size and begins to prospectively download additional portions of the object into the first sliding window extent.

The virtual file system receives a second file request (e.g., application access request $155_2$) from the application, and allocates an immediate window $159_2$ as well as a second sliding window extent (e.g., a second sliding window size $171_2$) and begins to prospectively download additional portions of the object into the second sliding window extent.

After some events be the application, or after a timeout delay, the virtual file system receives application requests (e.g., using application access request $155_3$) to access the additional portions of the object that were prospectively downloaded into the first sliding window extent. The virtual file system increases the size of the first sliding window extent (e.g., see extended sliding window size 176) to accommodate additional predicted access activity. In some cases the application does not access the prospectively downloaded content. As such, after a delay (e.g., while waiting for the application to access the downloaded content), the virtual file system will decrease the size of the second sliding window extent (e.g., see decreased sliding window size 178).

One embodiment of a system for implementing the herein disclosed sliding window techniques for file-agnostic data downloading in a virtual file system for cloud-based shared content is shown and described as pertaining to FIG. 2.

FIG. 2 presents an interconnection diagram 200 showing communications between system components that cooperate to implement file-agnostic data downloading in a virtual file system. As an option, one or more variations of interconnection diagram 200 or any aspect thereof may be implemented in the context of the architecture and functionality of the embodiments described herein. The interconnection diagram 200 or any aspect thereof may be implemented in any environment.

FIG. 2 presents various system components in a local environment 250 and a cloud-based storage environment 260 that can be used to implement a virtual file system 186 according to the herein disclosed techniques. Specifically, each instance of various user devices (e.g., user device $102_1$, user device $102_2$, . . . , user device $102_N$) can run certain applications that can interface with a local instance of the virtual file system 186. More specifically, the user device $102_1$ operated by the user 106 is shown running a file management application 104 that interacts with the virtual file system 186. According to some embodiments, the virtual file system 186 can comprise a file system interface 202, a local data manager 204, a cloud executor 206, a file system executor 208, a remote data manager 210, and a local storage 212. As shown, the local storage 212 can comprise a local cache 214 and a set of local metadata 216.

For example, the local cache 214 might comprise one or more partitions of the local memory of the user device 102₁. Further, the local metadata 216 can comprise internal data structures for fast access. In some cases, such internal data structures can be protected (e.g., locked). Further, data structures for the local metadata 216 can hold a set of local metadata attributes 248, as shown. For example, the local metadata attributes 248 for each object accessible by the virtual file system 186 might include a nodeID uniquely identifying a certain node in a file tree associated with the object, a type attribute describing the node and/or object type (e.g., folder, file, etc.), a remoteID uniquely identifying the object in the cloud-based storage environment 260, a version attribute describing the version of the object (e.g., from the perspective of the local environment 250), a name for the object, a localChange bit indicating a local change (e.g., bit=1) that has yet to be confirmed at the cloud-based storage environment 260, a set of permissions for the object (e.g., full access, view-only, unlocked, locked, etc.), one or more timestamps to indicate various events (e.g., last accessed, last modified, created, etc.), and/or other attributes. In some cases, the localChange bit might indicate that a local change has occurred merely for a short time, since it can be cleared (e.g., bit=0) when confirmation that the change was committed remotely has been received by the virtual file system 186. In other cases, the local metadata 216 can be specific to the operating system (OS) of the user device. For example, the structure and/or attributes associated with the local metadata 216 might be established at compile time of the virtual file system 186 based at least in part on a target OS. As a specific example for Mac OS, the local metadata attributes 248 might further include xattr extended attributes, a UID user identifier, and/or a groupID group identifier.

As shown in the cloud-based storage environment 260, a content management server 256 can represent the various computing devices that carry out the operations of a cloud-based shared content storage platform (e.g., cloud-based storage system 110 earlier described). The content management server 256 can interface with the storage devices 120 that can comprise a set of shared content 280, a set of object metadata 294, and/or other data to facilitate the cloud-based storage operations. As shown, the object metadata 294 can comprise certain instances of object metadata attributes 226 that characterize the objects 228 stored in the cloud-based storage environment 260. For example, the object metadata attributes 226 might include certain attributes that characterize the location, version, permissions, access rules, and/or other characteristics of a given object.

Further, the shared content 280 can store the objects 228 comprising the underlying data accessed by the various user devices in the local environment 250 using the herein disclosed techniques. Specifically, the herein disclosed techniques might facilitate downloading certain portions (e.g., data blocks) of the objects 228 for storage in the local cache 214. Such local cache storage can facilitate a low latency access to the large volumes of shared content 280 in the cloud-based storage environment 260 on a user device having a limited local storage capacity in the local environment 250. For example, the user 106 of the user device 102₁ might belong to an enterprise that owns large volumes of shared enterprise content that the user might need to access. However, the user device 102₁ might only be able to store a small portion of the shared enterprise content. Access to such large volumes of shared content stored on a remote cloud-based storage platform by multiple collaborators using resource-limited (e.g., memory-limited) local user devices can be facilitated by the embodiment of the herein disclosed virtual file system shown in FIG. 2.

Specifically, the user 106 of the user device 102₁ might invoke various file system operations from the file management application 104 that are received by the file system interface 202 of the virtual file system 186. The file system interface 202 can interpret the file system calls (e.g., in an application-specific and/or OS-specific structure) for dispatch to the local data manager 204 in a structure common (e.g., platform-agnostic, OS-agnostic) to the virtual file system 186. In some embodiments, the data downloading engine 192 and/or the data downloading rules 194 might be implemented in the local data manager 204 to intercept certain calls (e.g., file requests) to facilitate the various techniques disclosed herein (e.g., file-agnostic data downloading). In response to the dispatched call from the file system interface 202, the local data manager 204 can issue one or more commands and/or calls to the file system executor 208 and/or the cloud executor 206.

For example, the file system executor 208 might process commands for the local environment 250, while the cloud executor 206 might process commands for the cloud-based storage environment 260. Specifically, the file system executor 208 can process commands and/or calls associated with the local storage 212 such as a change to the local metadata 216 and/or a change to the local cache 214. For example, an edit to a portion (e.g., chunk, data block, etc.) of an object using the file management application 104 might invoke a call to the file system executor 208 to change various metadata attributes (e.g., version, size, last modified timestamp, etc.) in the local metadata 216 and/or change portions of the local cache 214 corresponding to the modified object chunk. In some cases, such operations by the file system executor 208 are invoked synchronously in response to the originating file system call dispatched from the file system interface 202.

In comparison, the cloud executor 206 can receive calls from the local data manager 204 into a work queue 242 for asynchronous delivery (e.g., see asynchronous messages 232₁) to the content management server 256 through the network 108. For example, the foregoing edit to a portion of an object using the file management application 104 might also invoke a call to the cloud executor 206 to change various object metadata attributes (e.g., version, size, last modified timestamp, etc.) in the object metadata 294 and/or change portions of the shared content 280 corresponding to the modified object portion. Such operations can be issued from the work queue 242 as an instance of the asynchronous messages 232₁.

As shown, the content management server 256 can receive such asynchronous messages from any and all (e.g., N) user devices of various collaborators. A cloud conflict remediator 234 at the content management server 256 can reconcile the information (e.g., versions, object changes, etc.) received from the local environment 250 to deliver (e.g., broadcast) the reconciled information to the N user devices of the collaborators in a set of asynchronous messages 232₂. For example, the asynchronous messages 232₂ might include metadata updates and/or object updates. Such asynchronous updates can be received locally by a listener 244 at the remote data manager 210. The remote data manager 210 can schedule the received changes with the file system executor 208 to be applied to the local storage 212. In some cases, a local conflict remediator 246 at the remote data manager 210 might reconcile certain local conflicts (e.g., among various local online and/or offline versions and remote versions). The foregoing approach facilitates use models where each collaborator can work asynchronously (e.g., independently) on various shared content, yet enjoy low latency responsivity (e.g., near real time) updates pertaining to operations performed by other collaborators in a respective instance of the local environment 250.

The system components of FIG. 2 present merely one partitioning. The specific example shown is purely exemplary, and other partitioning is reasonable. One embodiment of an implementation of the herein disclosed techniques comprising certain components from the system components of FIG. 2 is shown in FIG. 3.

FIG. 3 is a block diagram 300 showing interactions with components of a virtual file system to facilitate file-agnostic data downloading in a highly collaborative cloud-based environment. As an option, one or more variations of block diagram 300 or any aspect thereof may be implemented in the context of the architecture and functionality of the embodiments described herein. The interactions in block diagram 300 or any other aspects thereof may be implemented in any environment.

The embodiment shown in FIG. 3 shows a logical view of certain components, interconnects, and/or data flows of the virtual file system 186 to facilitate the herein disclosed techniques for file-agnostic data downloading in a highly collaborative cloud-based environment. Specifically, a set of file requests 162 can be received at the file system interface 202 of the virtual file system 186. For example, the file requests 162 might pertain to a requested file $148_2$ stored in the cloud-based storage environment 260. The file requests 162 can be issued from the file management application 104 associated with the user 106. In some cases, the file requests 162 can be parsed and/or transformed by the file system interface 202 to present a set of file request parameters 362 to the local data manager 204.

According to the herein disclosed techniques, a data downloading engine 192 at the local data manager 204 can apply one or more of the file request parameters 362 to the data downloading rules 194 to generate certain instances of immediate download requests 164 and/or certain instances of background download requests 165. In some embodiments, the data downloading engine 192 might further apply certain instances of system performance parameters 370 to the data downloading rules 194 to generate the immediate download requests 164 and/or the background download requests 165. For example, according to some embodiments, the system performance parameters 370 might be provided by a performance monitor 308 at the file system executor 208 of the virtual file system 186. In some embodiments, the various instances of the immediate download requests 164 and/or the background download requests 165 can be characterized by an associated instance of a processing priority.

For example, the processing priority of the immediate download requests 164 might be higher than the processing priority of the background download requests 165 such that the immediate download requests 164 are processed prior to processing of the background download requests 165. In such cases, the background download requests 165 can be scheduled for processing at certain selected moments in time (e.g., scheduled times). For example, the scheduled times of the background download request 165 might be based on certain instances of the system performance parameters 370 (e.g., network availability) as applied to the data downloading rules 194. In some cases, the processing priority of a given download request can be modified based on certain events. Specifically, receiving a second file request might cancel any download requests issued based on a first file request. For example, downloading thumbnails for a requested directory might be interrupted responsive to a request to open one of the files in the directory. The processing priority of an immediate download request might be modified to the processing priority of a background download request responsive to some event (e.g., a file request, user mouse-over, network degradation, collaborator activities, etc.). In some cases, a notification might be delivered to the file management application 104 when a download is interrupted (e.g., delayed, canceled, etc.).

An event queue is provided. An event queue can be wholly or partially situated within a local data manager. A data downloading engine 192 can access such an event queue. Determination of which download requests to process, and under what conditions to process them, can be made by the data downloading engine. Strictly as examples, the event queue might include codifications (e.g., metadata) to any or all of the aforementioned events (e.g., a file request event, user mouse-over event, network change event, last access event, last modified event, etc.).

In some embodiments, the immediate download requests 164 and/or the background download requests 165 can be generated by applying the file request parameters 362 and/or the system performance parameters 370 to the data downloading rules 194 as input variables associated with the rule logic. Specifically, such operators can be represented by the shown set of downloading rule operators 394. For example, some of the downloading rule operators 394 might correspond to the file request parameters 362 such as an appParams operator pertaining to an application (e.g., file management application 104), a fileParams operator pertaining to a requested file (e.g., requested file $148_2$), a reqParams operator pertaining to a request call, a taskStatus operator pertaining to a status request for a task, a userLog operator pertaining to a user history, and/or other parameters. Some of the downloading rule operators 394 might correspond to the system performance parameters 370 such as a localStorage operator pertaining to a local storage space availability, a netAvail operator pertaining to a network availability, a netSpeed operator pertaining to a network download speed, a collabStatus operator pertaining to an object collaboration status, a collabLog operator pertaining to an object collaboration history, and/or other parameters.

As an example, a file request specifying access to the first 32 kB (e.g., bytes 0 k-32 k) of a 1 GB file might include a file identifier (e.g., file ID) and an offset and length of the data block in the file request parameters 362 to be applied to the fileParams operator and the reqParams operator, respectively, of the data downloading rules 194. The data downloading engine 192 might receive certain instances of the system events and/or system performance parameters 370. For example, such system events and/or performance parameters might indicate a network availability parameter of 50% and a network speed parameter of 50% of maximum download speed to apply to the netAvail operator and the netSpeed operator, respectively, of the data downloading rules 194. In this case, the data downloading engine 192 will request a download of the entire 32 kB portion. It will apply the given set of received parameters to the data downloading rules 194 to generate one immediate download request for the requested 32 kB data block and will also generate three background download requests (e.g., for bytes 32 k-64 k, bytes 64 k-96 k, and bytes 96 k-128 k).

As shown, the immediate download requests 164 and/or the background download requests 165 generated by the data downloading engine 192 can be delivered to the cloud executor 206 for dispatch to the cloud-based storage environment 260. The cloud-based storage environment 260 can respond to the issued download requests by delivering the data blocks corresponding to the download requests to the remote data manager 210 at the virtual file system 186. The remote data manager 210 can deliver the resulting instance of the data response stream 167 to the file system executor 208 for storage in the local cache 214. The file system executor 208 can further update the local metadata 216 based on the received data blocks comprising the data response stream 167.

In certain embodiments, receiving the data blocks associated with a given issued download request can trigger a closing of the file request that precipitated the issued download request. For example, a file request issued in a TCP call might be closed by canceling the HTTP call. Closing the file request can enable access to a certain portion of a file without the full file being downloaded locally. In some cases, a file request might be split into one or more download requests (e.g., immediate and/or background) such that a message to the file management application 104 from the virtual file system 186 to close a first file request (e.g., the originating file request) might further comprise instructions to invoke one or more additional file requests to retrieve certain remaining data not yet downloaded (e.g., from background download requests). Such instructions can be included in the rules-based data responses 168. In some cases, certain portions of the requested data might exist in the local cache 214 as instances of local cache contents 314. In such cases, the local cache data 368 from the local cache contents 314 can be delivered to the file management application 104 without issuing an immediate and/or a background download request to the cloud-based storage environment 260.

An embodiment of a rules-based data downloading technique that can be implemented in systems such as are described in FIG. 3 and as are discussed as pertaining to FIG. 4.

FIG. 4 presents a rules-based data downloading technique 400 facilitated by a virtual file system in a highly collaborative cloud-based environment. As an option, one or more variations of rules-based data downloading technique 400 or any aspect thereof may be implemented in the context of the architecture and functionality of the embodiments described herein. The rules-based data downloading technique 400 or any aspect thereof may be implemented in any environment.

The rules-based data downloading technique 400 presents one embodiment of certain steps and/or operations for efficient, file-agnostic data downloading of shared content from a highly collaborative cloud-based environment to a local device according to the herein disclosed techniques. In one or more embodiments, the steps and underlying operations shown in the rules-based data downloading technique 400 can be facilitated, in part, by a data downloading engine at a local data manager of a virtual file system such as described in FIG. 2 and throughout this specification. As shown, the rules-based data downloading technique 400 can commence with listening for file requests (at step 402). For example, such files requests might be issued from one or more applications on a user device. If no file requests are received (see "No" path of decision 404), listening for file requests can continue. If one or more file requests are received (see "Yes" path of decision 404), certain file request parameters characterizing the file request can be determined (at step 406). For example, such file request parameters might be associated with a file identifier, file location, requested portion (e.g., offset and range or length of data), and/or other aspects of the file requests. The file request parameters and/or other information can be used to determine the handling of any existing running and/or scheduled data downloads (at step 408). For example, a received file request might override an earlier issued file request such that any data downloads associated with the earlier issued file request can be canceled. In some cases, a scheduled data download associated with an earlier issued file request might not be canceled, but the processing priority of a scheduled data download can be modified to a lower priority than the processing priority of a respective one or more data downloads associated with the received file requests. In other cases, earlier running and/or scheduled data downloads might be allowed to complete before invoking any further data downloads.

The rules-based data downloading technique 400 can further collect certain data download rule operator parameters to apply to a given set of data download rules (at step 410). For example, the file request parameters, system performance parameters, and/or other parameters corresponding to various rule operators (e.g., input variables for the rules) can be collected. Such data download rule operator parameters can be applied to the data download rules to generate one or more immediate priority data downloads (at step 412). For example, the data download rules might prioritize the download of the data blocks the user would first expect to view (e.g., page 1 of the document) in an immediate priority data download. The local cache can be checked to get any of the immediate priority data from the local cache content (at step 414). Any immediate priority data not in the local cache can be downloaded from the cloud storage to the local cache (at step 416). For example, one or more immediate download requests can be issued to the cloud storage environment to download the immediate priority data. In the case of multiple immediate download requests, the data (e.g., data blocks) from the cloud storage can comprise a data stream. The downloaded immediate priority data can then be availed to the application that issued the file requests (at step 418). In some cases, receiving the immediate priority data might also invoke the closing of the application file request (at step 420). For example, closing the file request might release the application to present the immediate priority data (e.g., page 1 of the document) to the user.

The collected data download rule operator parameters can also be applied to the data download rules to generate one or more background priority data downloads (at step 422). For example, the data download rules might prioritize the download of the data blocks that the user would be expected to view later (e.g., last edited page of the document) in a background priority data download. The local cache can be checked to get any of the background priority data from the local cache content (at step 424). Any background priority data not in the local cache can be scheduled for download from the cloud storage (at step 426). For example, one or more background download requests can be scheduled for delivery to the cloud storage environment to download the background priority data. In some cases, the scheduled time for the background priority data downloads can be derived from the data download rule operator parameters and/or the data downloading rules. For example, if the data download rule operator parameters indicate the network conditions are poor, the data downloading rules might determine scheduled times for the background priority data downloads based on when the network conditions are expected to improve. The background download requests can then be launched at their respective scheduled times (at step 428). When multiple background download requests are issued to the cloud storage environment, the data (e.g., data blocks) returned from the cloud storage can comprise a data stream that can be stored in the local cache (at step 430). The downloaded background priority data can then be availed to the application as requested by the user (at step 432). A file display technique is shown and discussed as pertaining to FIG. 5A and FIG. 5B.

Figure 5A:
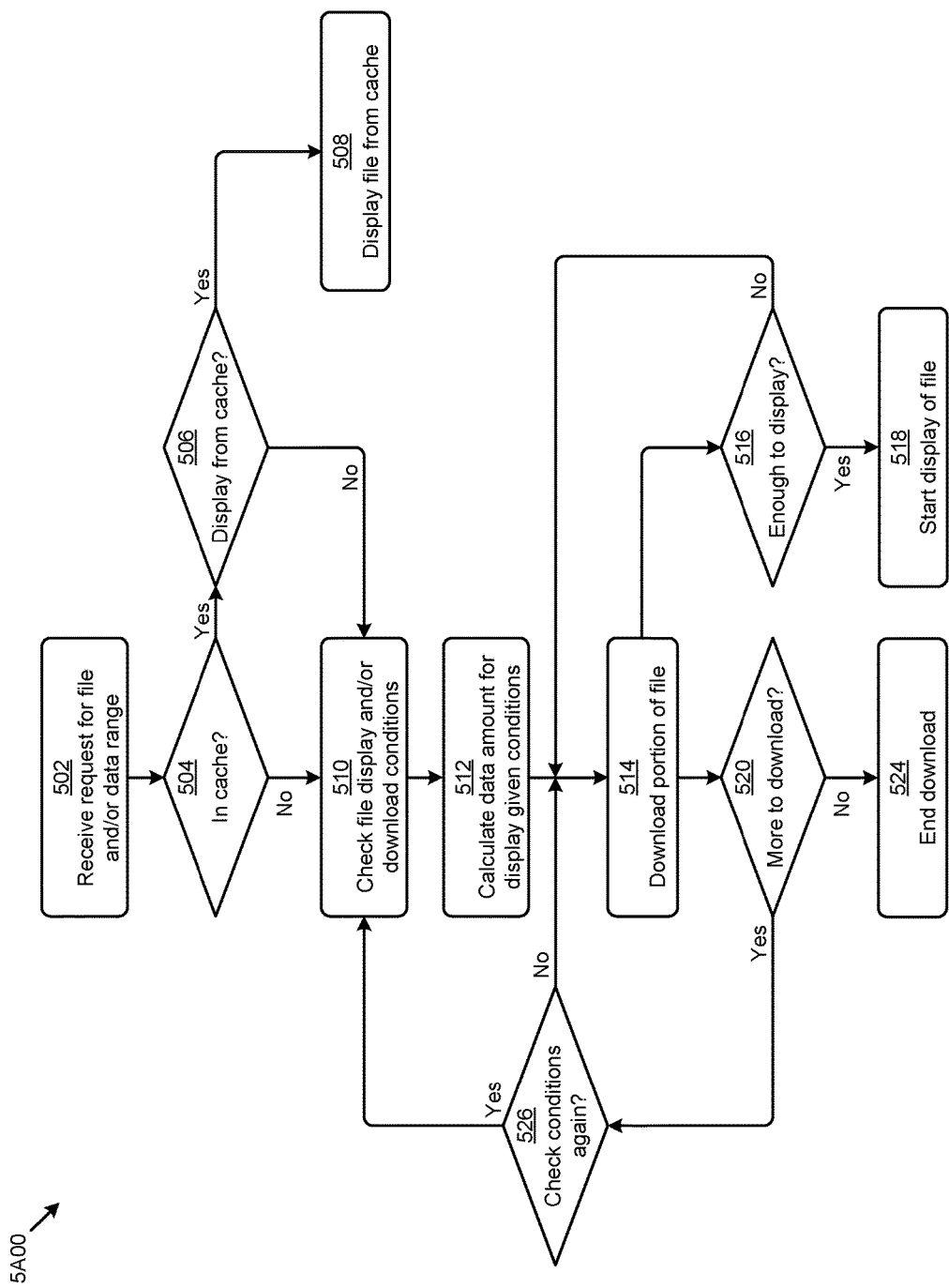
FIG. 5A and FIG. 5B depict file display techniques implemented in a virtual file system that facilitates file-agnostic data downloading in a highly collaborative cloud-based environment, according to an embodiment.

FIG. 5A depicts a file display technique 5A00 implemented in a virtual file system that facilitates file-agnostic data downloading in a highly collaborative cloud-based environment. As an option, one or more variations of file display technique 5A00 or any aspect thereof may be implemented in the context of the architecture and functionality of the embodiments described herein. The file display technique 5A00 or any aspect thereof may be implemented in any environment.

As earlier mentioned, certain legacy techniques for presenting a local device representation of a shared content object stored on a cloud-based storage system can be limited at least in regard to long latencies associated with presenting the shared content object locally to the user. In some cases, the quality associated with presenting the shared content object locally to the user can also be limited in legacy approaches. For example, consider a local device request of a video file stored across the network in a cloud-based storage system. If network conditions are good (e.g., high download speeds), the video might be streamed across the network without any quality issues (e.g., stalls, interruptions, etc.) pertaining to the display of the video that can be perceived by the user. However, situations often exist where such video downloads can occur during periods of varying network conditions. In certain legacy approaches, the display of the video at the local device might commence when the first portion of data pertaining to the video file is received at the local device. If the network conditions were to degrade following the commencement of the display of the video at the local device, certain quality issues (e.g., intermittent interruptions in the video display) might be perceived by the user.

The file display technique 5A00 illustrates an improved approach to displaying data from a cloud-based storage system on a local user device using a virtual file system, according to the herein disclosed techniques. As shown in the file display technique 5A00, portions of data (e.g., chunks, data blocks, etc.) from the requested file are continuously requested to be displayed responsive to when sufficient amounts of the data are received locally. For example, this technique can facilitate a display of the data having no interruptions that can be perceived by the user. Specifically, the herein disclosed techniques can address the problems of legacy approaches pertaining to displaying (e.g., playback of video files) of data during varying network conditions.

Specifically, the file display technique 5A00 might commence with a request being received to access a file and/or data from cloud-based storage system (at step 502). The requested file and/or data may correspond to any granularity of data. For example, in some cases, an entire file may be requested. In other cases, a range of data can be requested. For example, a portion (e.g., certain byte range) of a video file might be requested. The requested data may pertain to any type of structure or format. Specifically, the file display technique 5A00 and/or other techniques disclosed herein can be considered file-agnostic. For example, such techniques can be applied to the foregoing video file example, but also can be applied to other file types such as image files, audio files, or large structured documents having multiple portions (e.g., large PDF documents).

A determination can made whether the requested file (e.g., byte range) already exists in the local cache (see decision 504). For example, accessing data from the local cache can facilitate a low latency access to the requested file. If the data pertaining to the requested file is determined to be in the local cache (see "Yes" path of decision 504), a determination can further be made as to whether the data from the local cache is to be displayed (see decision 506). If the local cache data is determined to be displayed (see "Yes" path of decision 506), the local cache data can be used to facilitate display and/or playback of the requested file (at step 508). In some cases, a refresh of the data in the local cache might be desired such that the local cache data might not be used for display of the requested file (see "No" path of decision 506).

If the file does not already exist in the local cache (see "No" path of decision 504) and/or a decision is made not to retrieve data from cache (see "No" path of decision 506), then a data manager (e.g., data download engine) is invoked to obtain the file from the cloud-based storage system across the network. In some cases, a portion of the requested file might exist in the local cache, but the remaining portion of the requested file can be retrieved by the download manager from the cloud-based storage system. Specifically, the download manager might check certain aspects of the current conditions pertaining to the display and/or download of the file such as, for example, information about the size of the file, the network conditions (e.g., network speeds for downloading the file), and/or other aspects (at step 510).

The foregoing conditions can be used to calculate an amount of data to be available locally to achieve certain file display quality metrics (at step 512). As an example, such calculations can identify, given the rate of data consumption of the local data display application (e.g., from local cache) and the rate at which the data can be downloaded (e.g., from the cloud into local cache), how much data needs to be downloaded (e.g., replenished) to the local cache (e.g., to facilitate an uninterrupted display or other processing of the file). The calculated data amount can then be downloaded from the cloud-based storage system (at step 514). In some cases, one or more download worker entities may be implemented to perform the download. Each download worker entity may pertain to a processing unit such as a process, thread, task, processor, and/or other computing entity. In some embodiments, the data can be downloaded in portions (e.g., chunks, data blocks) of a given unit size. The downloaded data can be placed into the local cache in a suitable local storage medium. A determination can then be made whether the quantity that has been downloaded is sufficient to begin display of the data (see decision 516). For example, this check can refer to the earlier calculated data amount (at step 512). If enough data has been downloaded (see "Yes" path of decision 516), then the file can be displayed to the user (at step 518). If, however, the then current downloaded data is insufficient to display (see "No" path of decision 516), the process can continue to downloading more data (at step 514).

In some embodiments, even when enough data has been downloaded for display (see "Yes" path of decision 516), the file display technique 5A00 can still download additional data in the background. Specifically, if there is more data to download (see "Yes" path of decision 520), the process can continue to download more data. In some cases, the current conditions might not be checked before continuing to download more data (see "No" path of decision 526). In other cases, the current conditions might be checked before continuing to download more data (see "Yes" path of decision 526). For example, if a certain time has lapsed since the originating file request and/or a previous conditions check, the current conditions might be checked to facilitate determining the data to be downloaded. Such continued checks can be performed to adjust as necessary to fluctuating network speeds and/or other operating conditions. When there is no more data to download (see "No" path of decision 520), the download can be ended (see step 524). In some embodiments, the full file might not be downloaded, but the downloading might be stopped, for example, when a certain amount of data (e.g., data buffer) is available in the local cache, and/or might be continued, for example, when the data buffer is below a certain threshold.

Figure 5B:
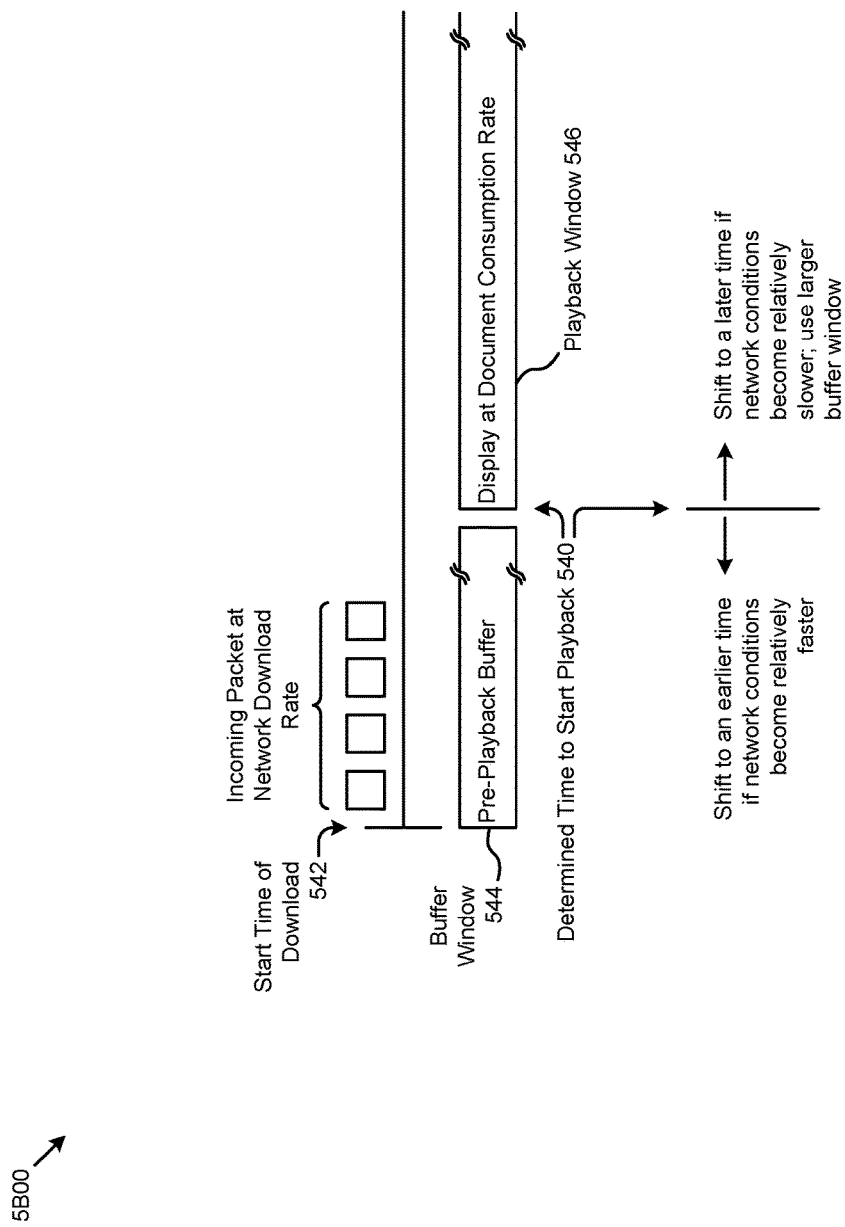

FIG. 5B depicts a multi-window file display technique 5B00 implemented in a virtual file system that facilitates file-agnostic data downloading in a highly collaborative cloud-based environment. As an option, one or more variations of multi-window file display technique 5B00 or any aspect thereof may be implemented in the context of the architecture and functionality of the embodiments described herein. The multi-window file display technique 5B00 or any aspect thereof may be implemented in any environment.

The technique includes repeated calculations to determine time and size extents of two windows: (1) a window to model time and size characteristics of an extent to hold portions of a file to be downloaded and displayed, and (2) another window to serve as a buffer for prefetched data from the requested file.

The shown method implements window-based prefetching in a virtual file system. A user requests accesses to a requested file over a network (see step 502 of FIG. 5A). The method includes determining an initial time to start playback 540 or other display of the requested file. The start time is determined after calculating the extent of a first window (e.g., a buffer window 544). The calculation can include a download starting time 542, a set of network conditions, the size of the requested file, a consumption rate, and other variables (see step 510 of FIG. 5A). In some cases, calculating the extent of a first window is based in part on variables used to calculate the extent of the second window (e.g., a playback window 546). For example, a time range and size extent of the first window (e.g., a buffer window) and the second window (e.g., a media playback window, a file display window) might be calculated using sequential (e.g., chained calculations), they might be calculated in parallel (see step 512 of FIG. 5A). Variables used in the aforementioned calculations can include the download starting time of the first window, an observed set of network conditions (e.g., the incoming data rate as portions of the requested file are received as a stream of incoming Internet protocol packets), the size of the requested file, and the consumption rate. The consumption rate of a file might be determined on the basis of the file type itself (e.g., in cases of media files), or the consumption rate of a file might be determined on the basis of non-media file aspects of the file, and/or the consumption rate of a file might be determined on the basis of heuristics pertaining to user behaviors, such as scrolling rates through a text-oriented document, or paging through a series of arrays of images, etc.

Given the results of the aforementioned calculations, and strictly as one possible use case, a delay time period to delay before starting display of the requested file can be determined, where the introduction of a delay serves to ensure that there is enough prefetched data in the buffer window to account for data being consumed in the file display window. In some cases, the calculated delay time period is long enough that the system can recalculate values for the first extent and for the second extent. The delay period to continue prefetching before entering the playback window can increase or decrease based on changing conditions (e.g., network download speed conditions, network latency conditions, etc.). Specifically, the initially calculated start time can be shifted to an earlier time (e.g., when network conditions are measured to be relatively faster) or, the initially calculated start time can be shifted to a later time (e.g., when network conditions are measured to be relatively slower). Recalculation can be done periodically (see decision 526 of FIG. 5A), including before the initial (e.g., delayed) display of the file (see step 518 of FIG. 5A) and/or after the initial display of the file.

Figure 6:
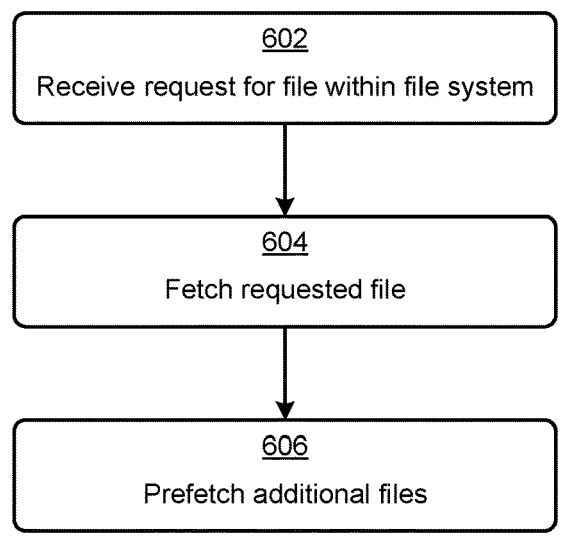
FIG. 6 depicts a file prefetch technique implemented in a virtual file system that facilitates file-agnostic data downloading in a highly collaborative cloud-based environment, according to some embodiments.

Certain file prefetching techniques can further be implemented using the herein disclosed techniques, as shown and described as pertaining to FIG. 6.

FIG. 6 depicts a file prefetch technique 600 implemented in a virtual file system that facilitates file-agnostic data downloading in a highly collaborative cloud-based environment. As an option, one or more variations of file prefetch technique 600 or any aspect thereof may be implemented in the context of the architecture and functionality of the embodiments described herein. The file prefetch technique 600 or any aspect thereof may be implemented in any environment.

Specifically, the file prefetch technique 600 can commence (at step 602) by receiving a request for a file within a file system (e.g., a virtual file system). For example, a user might request a file stored on a cloud-based storage system from an application operating on a local user device. Responsive to receiving the file request, the requested file can be fetched from the cloud-based storage system to the local user device (at step 604). Additional files can also be prefetched for the user (at step 606). Specifically, the additional file or files to prefetch can be determined according to the herein disclosed techniques for rules-based file-agnostic data downloading in a highly collaborative cloud-based environment. Using such techniques, the structure of the data comprising the requested data object (e.g., file) can be used to determine the additional files to prefetch. Specifically, a request to access an image file (e.g., picture) from a given directory might indicate that other images from the directory might be requested. In such cases, one or more of the other images in the directory might be prefetched.

As another example, historical file access patterns may be used to determine certain files to be prefetched. Specifically, if a user routinely requests a certain file after requesting a certain directory view, that file might be prefetched responsive to a request to view the directory. In another example, certain machine learning techniques can be implemented to identify which files to prefetch. Specifically, a machine learning algorithm might be used to construct correlations pertaining to the data downloading rules and/or the data downloading operator parameters. Further, for example, observations of user and/or remote storage system behaviors can be taken, and clustering techniques can be used to analyze such behaviors to determine behavior-to-file-type associations and/or to determine certain groupings of files such that selected files from the groupings can be prefetched when an associated file is requested.

According to some embodiments, the foregoing file prefetch technique and/or other capabilities can be facilitated by the herein disclosed techniques using a virtual file system in a highly collaborative cloud-based environment. One embodiment of such a cloud-based environment is shown and described as pertains to FIG. 7A.

Figure 7A:
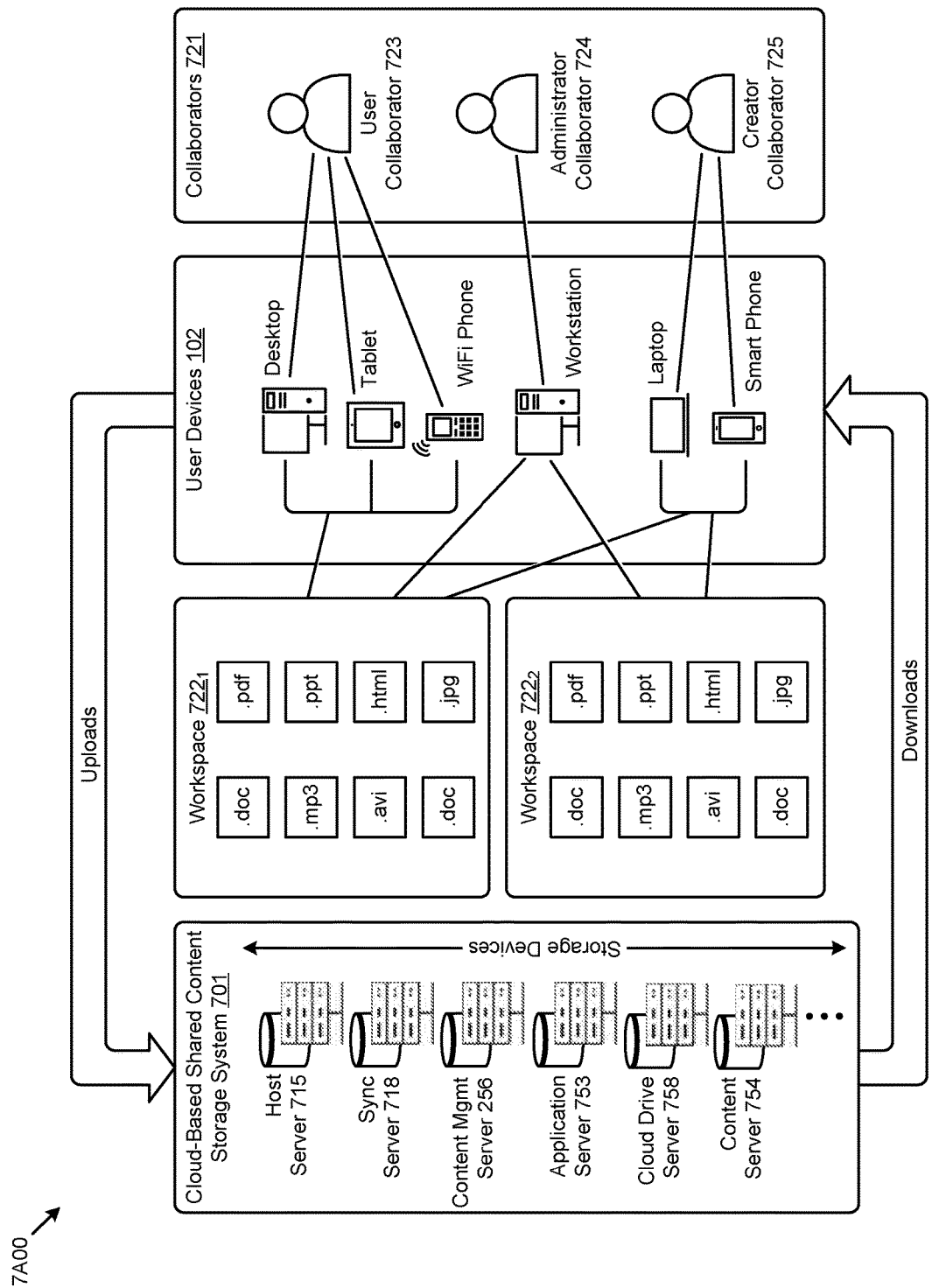
FIG. 7A depicts a cloud-based environment including a collaborative cloud-based shared content management platform that facilitates file-agnostic data downloading in a virtual file system, according to some embodiments.

FIG. 7A depicts a cloud-based environment 7A00 including a collaborative cloud-based shared content management platform that facilitates file-agnostic data downloading in a virtual file system. As an option, one or more variations of cloud-based environment 7A00 or any aspect thereof may be implemented in the context of the architecture and functionality of the embodiments described herein.

As shown, certain users (e.g., collaborators 721) having various collaboration roles (e.g., user collaborator 723, administrator collaborator 724, creator collaborator 725, etc.) can use one or more instances of user devices 102 to interact with one or more workspaces (e.g., workspace $722_1$, workspace $722_2$, etc.) within the cloud-based environment 7A00. The workspaces can be stored in any location, and are at least partially maintained by components within a cloud-based shared content storage system 701. The cloud-based shared content storage system 701 supports any variety of processing elements and/or storage devices (e.g., a storage filer, a storage facility, etc.) and/or servers such as a host server 715, a sync server 718, a content management server 256, an application server 753, a cloud drive server 758, a content server 754, etc.

Any of the users can access shared content from the cloud-based shared content storage system 701 without the additional process of manually downloading and storing a file locally on an instance of the user devices 102 such as a desktop computer, a tablet, a WiFi phone, a workstation, a laptop, a smart phone, and/or other user devices. For example, a content object (e.g., computer file, text document, audio file, video file, image file, etc.) created by the creator collaborator 725 might be viewed by the user collaborator 723 without informing the user collaborator 723 where the file is physically stored in the storage devices. Such a facility streamlines the frequently repeated sharing and collaboration processes.

Functions and techniques performed by the cloud-based shared content storage system 701 and/or the client-side components (e.g., user devices 102, a collaboration client and/or application on an instance of the user devices 102, etc.) are described herein with further details and with reference to several examples. Further details pertaining to implementing the herein disclosed techniques in the cloud-based environment 7A00 are described in FIG. 7B.

Figure 7B:
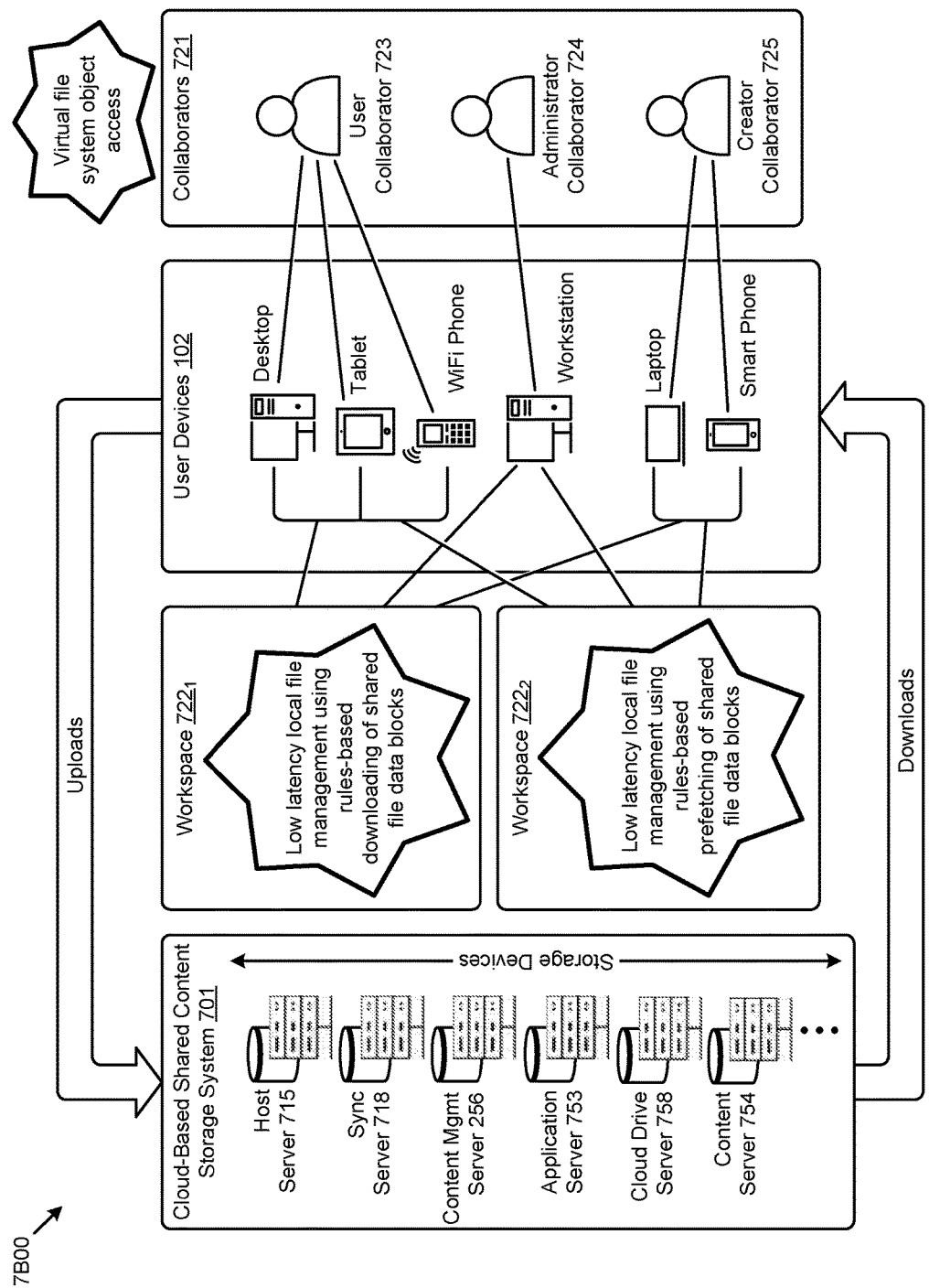
FIG. 7B presents a schematic view of a cloud-based environment having workspace activity pertaining to file-agnostic data downloading in a virtual file system, according to some embodiments.

FIG. 7B presents a schematic view 7B00 of a cloud-based environment having workspace activity pertaining to file-agnostic data downloading in a virtual file system. As an option, one or more variations of schematic view 7B00 or any aspect thereof may be implemented in the context of the architecture and functionality of the embodiments described herein. The schematic view 7B00 or any aspect thereof may be implemented in any environment.

The embodiment shown in FIG. 7B is merely one example of various activities and/or operations facilitated by the herein disclosed techniques for rules-based, file-agnostic data downloading in a virtual file system in a highly collaborative cloud-based environment. Specifically, as shown, the collaborators 721 (e.g., the user collaborator 723, the administrator collaborator 724, and the creator collaborator 725) in the cloud-based environment might use an instance of the virtual file system on one or more of the user devices 102 to access various shared content (e.g., objects) stored in the storage devices of the cloud-based shared content storage system 701. As shown in workspace $722_1$, the herein disclosed virtual file system techniques can facilitate low latency local file management (e.g., at each instance of the user devices 102) of shared files (e.g., from the cloud-based shared content storage system 701) using rules-based downloading of file data blocks. Further, as shown in workspace $722_2$, the herein disclosed virtual file system techniques can also facilitate low latency local file management (e.g., at each instance of the user devices 102) of shared files (e.g., from the cloud-based shared content storage system 701) using rules-based prefetching of shared file data blocks.

Additional Embodiments of the Disclosure

Additional Practical Application Examples

Figure 8A:
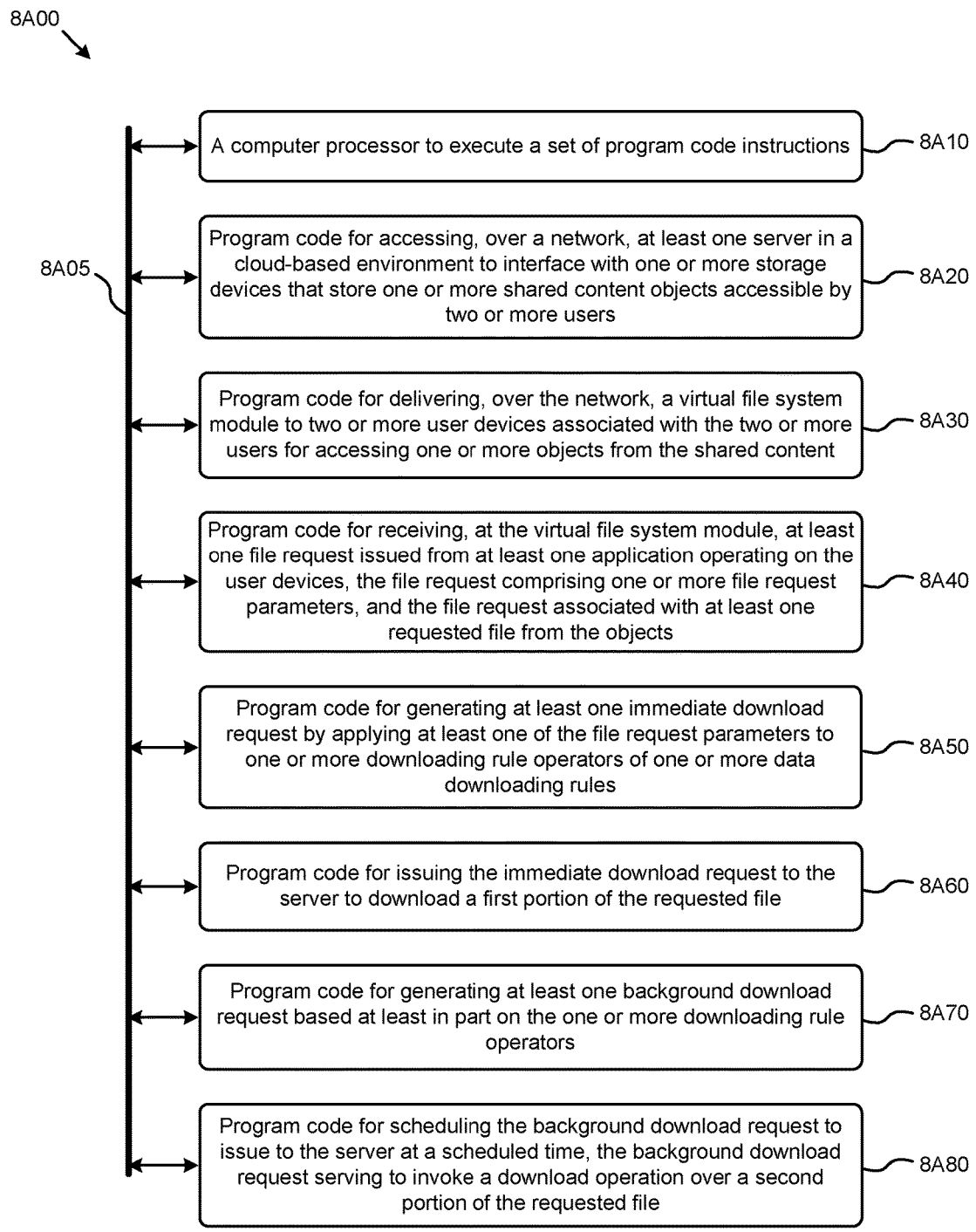
FIG. 8A and FIG. 8B depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment.

The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising a computer processor to execute a set of program code instructions (see module 8A10) and modules for accessing memory to hold program code instructions to perform: accessing, over a network, at least one server in a cloud-based environment to interface with one or more storage devices that store one or more shared content objects accessible by two or more users (see module 8A20); delivering, over the network, a virtual file system module to two or more user devices associated with the two or more users for accessing one or more objects from the shared content (see module 8A30); receiving, at the virtual file system module, at least one file request issued from at least one application operating on the user devices, the file request comprising one or more file request parameters, and the file request associated with at least one requested file from the objects (see module 8A40); generating at least one immediate download request by applying at least one of the file request parameters to one or more downloading rule operators of one or more data downloading rules (see module 8A50); issuing the immediate download request to the server to download a first portion of the requested file (see module 8A60); generating at least one background download request based at least in part on the one or more downloading rule operators (see module 8A70); and scheduling the background download request to issue to the server at a scheduled time, the background download request serving to invoke a download operation over a second portion of the requested file (see module 8A80).

Variations of the foregoing may include more or fewer of the shown modules and variations may perform more or fewer (or different) steps, and/or may use data elements in more, or in fewer or different operations.

Strictly as examples, some variations can include:
  Variations that further comprise acts for modifying a processing priority of at least one of, the immediate download request, the background download request, responsive to receiving at least one of, a second file request, the first portion of the requested file, and/or the second portion of the requested file.

Variations where modifying the processing priority cancels the immediate download request and/or the background download request.

Variations that further comprise acts for receiving the first portion of the requested file and/or the second portion of the requested file before taking actions to deliver either the first portion of the requested file and/or the second portion of the requested file.

Variations that further comprise closing the file request responsive to delivering a portion of the requested file.

Variations where system performance parameters are applied to one or more downloading rule operators to facilitate generating the immediate download request and/or the background download request.

Variations where the system performance parameters characterize at least one of, a local storage space availability, a network availability, a network download speed, an object collaboration status, and/or an object collaboration history.

Variations where the file request parameters characterize at least one of, the application, the requested file, a request call, a request status, and/or a user history.

Variations where determining the immediate download request and/or the background download request is based at least in part on a set of local cache contents.

Variations where the data download rule operator parameters and/or the data downloading rules are based on results from performing a machine learning algorithm over a set of file requests.

In some environments, a system implements methods for managing sizing of a plurality of sliding download windows in a virtual file system. Some embodiments commence by identifying at least one server in a cloud-based platform that interfaces with one or more storage devices that store one or more shared content objects accessible by two or more users, and delivering, over the network, a virtual file system module to two or more user devices associated with the two or more users for accessing one or more objects from the shared content.

The virtual file system module performs the acts of, receiving, at the virtual file system module, a first file request issued from at least one application operating on the user devices, the file request comprising at least one file extent request associated with at least one of the objects; allocating a first sliding window extent based on a default size of a prospective retrieval window size, prospectively downloading additional portions of the object into the first sliding window extent; receiving, at the virtual file system module, a second file request from the application; allocating a second sliding window extent based on a default size of the prospective retrieval window size, prospectively downloading additional portions of the object into the second sliding window extent; increasing the size of the first sliding window extent when the application requests access to the additional portions of the object that were prospectively downloaded into the first sliding window extent; and, after a delay, decreasing the size of the second sliding window extent when a further application request for additional portions of the object that were prospectively downloaded into the second sliding window extent has not been received.

Variations of the foregoing include:

Variations that further comprise receiving, from the server, at least one of, a first portion of the requested file, or a second portion of the requested file; and delivering, to the application, at least one of, the first portion of the requested file, or the second portion of the requested file.

Variations that further comprise closing the file request responsive to delivering, to the application, at least one of, the first portion of the requested file, or the second portion of the requested file.

Variations where one or more system performance parameters is further applied to one or more downloading rule operators of the data downloading rules to facilitate generating at least one of, the immediate download request, or the background download request.

Variations where the system performance parameters characterize at least one of, a local storage space availability, a network availability, a network download speed, an object collaboration status, and/or an object collaboration history.

Variations where the file request parameters characterize at least one of, the application, the requested file, a request call, a request status, and/or a user history.

Variations where determining at least one of, the immediate download request, or the background download request, is based at least in part on a set of local cache contents.

Variations where at least one of, the first portion of the requested file, or the second portion of the requested file, comprises one or more data blocks.

Variations where at least one of, one or more data download rule operator parameters, and/or one or more of the data downloading rules, is based at least in part on a machine learning algorithm.

Figure 8B:
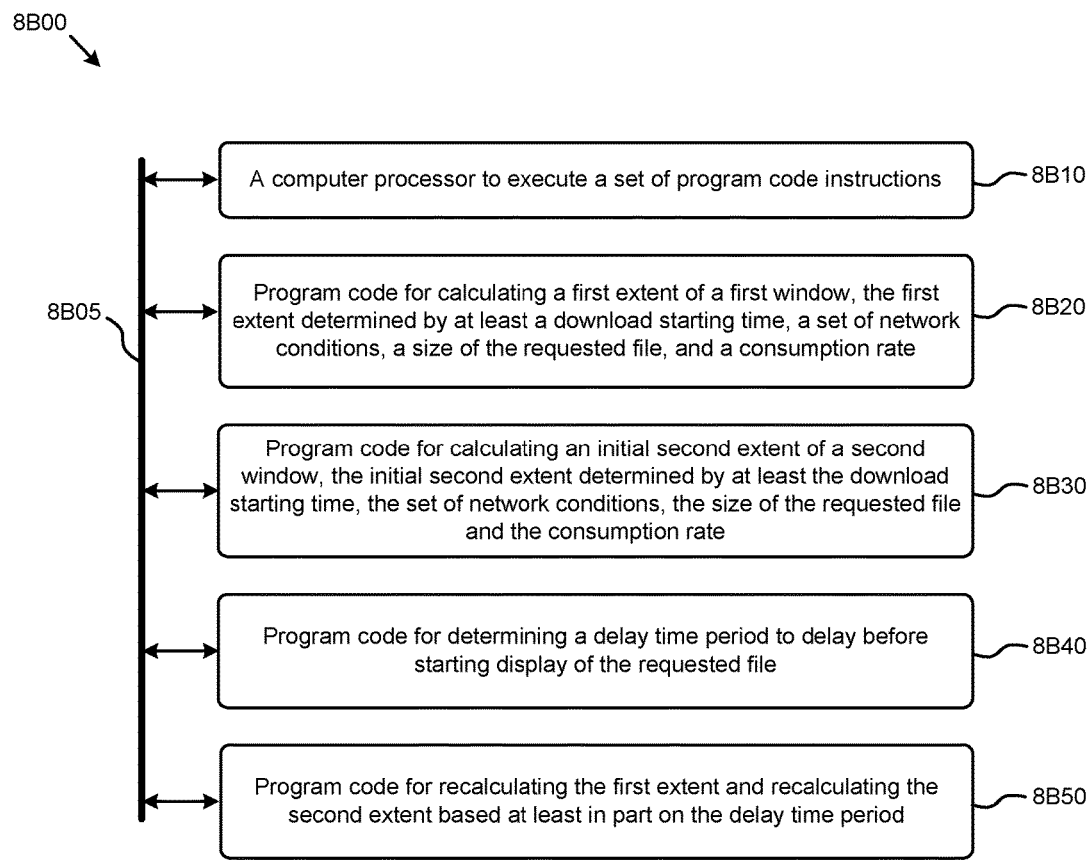

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment.

The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with other operations over communication path 8B05. The modules of the system can, individually or in combination, perform method operations within system 8B00. Any operations performed within system 8B00 may be performed in any order unless as may be specified in the claims.

The shown embodiment implements a portion of a computer system, presented as system 8B00, comprising a computer processor to execute a set of program code instructions (see module 8B10) and modules for accessing memory to hold program code instructions to perform: calculating a first extent of a first window, the first extent determined by at least a download starting time, a set of network conditions, a size of the requested file, and a consumption rate (see module 8B20); calculating an initial second extent of a second window, the initial second extent determined by at least the download starting time, the set of network conditions, the size of the requested file, and the consumption rate (see module 8B30); determining a delay time period to delay before starting display of the requested file (see module 8B40); and, when the delay period is sufficiently long (e.g., at least long enough to download one more packet under the previously-observed network conditions), then recalculating the first extent and recalculating the second extent based at least in part on the delay time period (see module 8B50).

System Architecture Overview

Additional System Architecture Examples

Figure 9A:
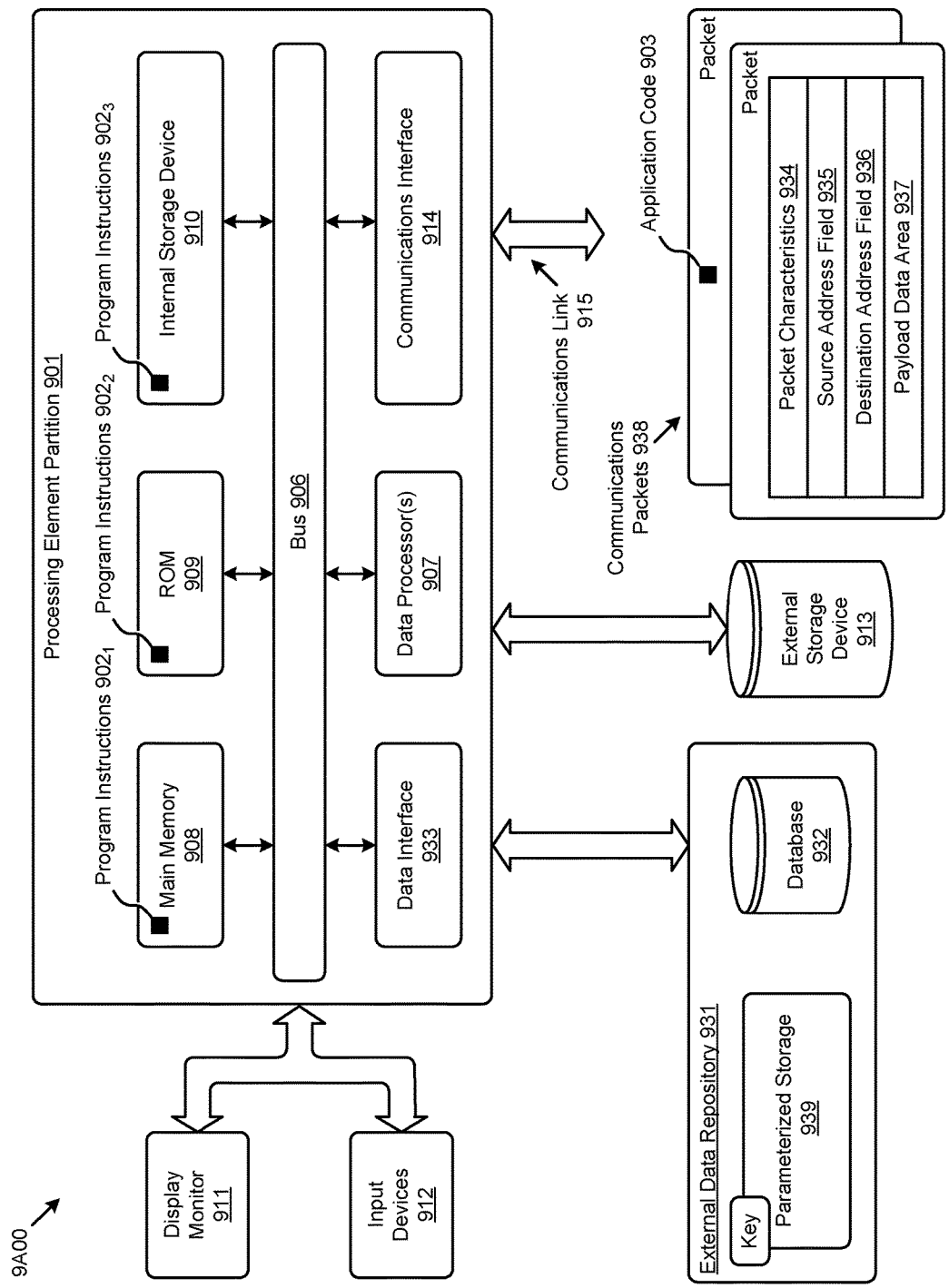
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. The shown computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program code instructions contained in a memory. Such instructions (e.g., program instructions $902_1$, program instructions $902_2$, program instructions $902_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 9A00 performs specific networking operations using one or more instances of communications interface 914. Instances of the communications interface 914 may comprise one or more networking ports that are configurable (e.g., pertaining to speed, protocol, physical layer characteristics, media access characteristics, etc.) and any particular instance of the communications interface 914 or port thereto can be configured differently from any other particular instance. Portions of a communication protocol can be carried out in whole or in part by any instance of the communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

The communications link 915 can be configured to transmit (e.g., send, receive, signal, etc.) any types of communications packets 938 comprising any organization of data items. The data items can comprise a payload data area 937, a destination address 936 (e.g., a destination IP address), a source address 935 (e.g., a source IP address), and can include various encodings or formatting of bit fields to populate the shown packet characteristics 934. In some cases the packet characteristics include a version identifier, a packet or payload length, a traffic class, a flow label, etc. In some cases the payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of the computer system 9A00. According to certain embodiments of the disclosure, two or more instances of computer system 9A00 coupled by a communications link 915 (e.g., LAN, PTSN, or wireless network) may perform the sequence of instructions required to practice embodiments of the disclosure using two or more instances of components of computer system 9A00.

The computer system 9A00 may transmit and receive messages such as data and/or instructions organized into a data structure (e.g., communications packets). The data structure can include program instructions (e.g., application code 903), communicated through communications link 915 and communications interface 914. Received program code may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

The processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). A module may include one or more state machines and/or combinational logic used to implement or facilitate the operational and/or performance characteristics of file-agnostic data downloading in a virtual file system for a highly collaborative cloud-based environment.

Various implementations of the database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of file-agnostic data downloading in a virtual file system for a highly collaborative cloud-based environment). Such files or records can be brought into and/or stored in volatile or non-volatile memory.

Figure 9B:
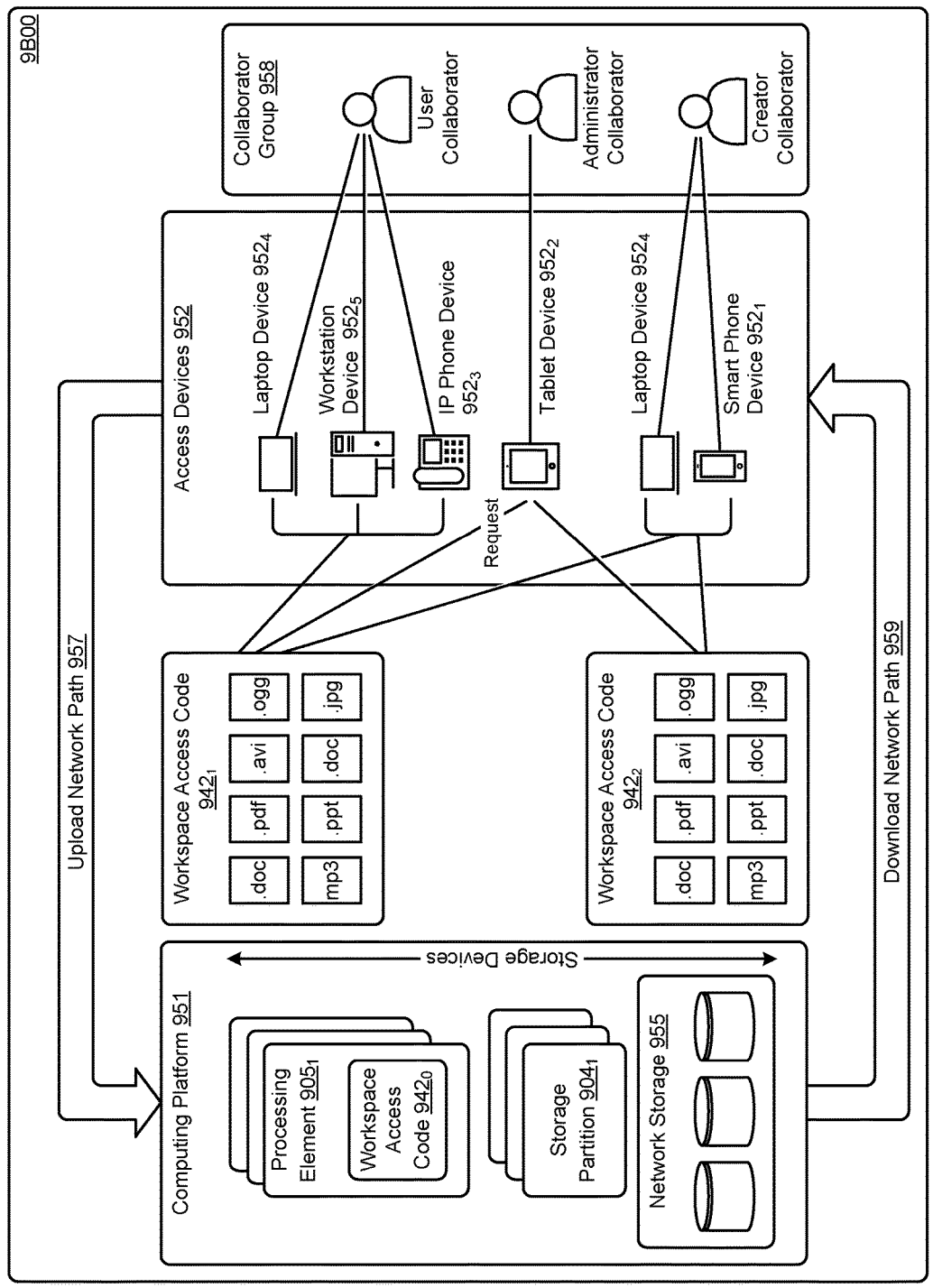

FIG. 9B depicts a block diagram of an instance of a cloud-based environment 9B00. Such a cloud-based environment supports access to workspaces through the execution of workspace access code (e.g., workspace access code $942_0$, workspace access code $942_1$, and workspace access code $942_2$). Workspace access code can be executed on any of the shown access devices 952 (e.g., laptop device $952_4$, workstation device $952_5$, IP phone device $952_3$, tablet device $952_2$, smart phone device $952_1$, etc.). A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. A portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such as the shown networked storage 955. Storage of workspaces and/or any constituent files or objects, and/or any other code or scripts or data can be stored in any one or more storage partitions (e.g., storage partition $904_1$). In some environments, a processing element includes forms of storage such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method to implement prefetching in a virtual file system that accesses a requested file over a network, the method comprising:
    calculating a first extent of a first window the first extent determined by at least a download starting time, a set of network conditions, a size of the requested file and a consumption rate;
    calculating an initial second extent of a second window, the initial second extent determined by at least the download starting time, the set of network conditions, the size of the requested file and the consumption rate;
    determining a delay time period to delay before starting display of the requested file;
    recalculating the first extent and recalculating the second extent based at least on the delay time period;
    downloading into memory corresponding to the first extent, a first set of portions of the requested file; and
    displaying, after the delay time period, at least some of the first set of portions of the requested file that was downloaded into memory in a file management application.

2. The method of claim 1, further comprising determining whether the requested file exists in a local cache.

3. The method of claim 2, further comprising calculating a download rate based at least in part on network conditions as measured during the downloading of the first set of portions of the requested file.

4. The method of claim 3, wherein the first set of portions of the requested file are composed of Internet Protocol packets.

5. The method of claim 3, further comprising downloading into memory corresponding to the first extent, a second set of portions of the requested file.

6. The method of claim 1, wherein the requested file corresponds to at least one of a video file, an audio file, an image file, or large structured document having multiple portions.

7. The method of claim 1, wherein a calculated time period to delay before starting display of the requested file is zero or non-zero.

8. A computer readable medium, embodied in a non-transitory computer readable medium, the non-transitory computer readable medium having stored thereon a sequence of instructions which, when stored in memory and executed by a processor causes the processor to perform a set of acts to implement prefetching in a virtual file system that accesses a requested file over a network, the acts comprising:

calculating a first extent of a first window, the first extent determined by at least a download starting time, a set of network conditions, a size of the requested file and a consumption rate;

calculating an initial second extent of a second window, the initial second extent determined by at least the download starting time, the set of network conditions, the size of the requested file and the consumption rate;

determining a delay time period to delay before starting display of the requested file;

recalculating the first extent and recalculating the second extent based at least on the delay time period;

downloading into memory corresponding to the first extent, a first set of portions of the requested file; and displaying, after the delay time period, at least some of the first set of portions of the requested file that was downloaded into memory in a file management application.

9. The computer readable medium of claim 8, further comprising instructions which, when stored in memory and executed by the processor causes the processor to perform acts of determining whether the requested file exists in a local cache.

10. The computer readable medium of claim 9, further comprising instructions which, when stored in memory and executed by the processor causes the processor to perform acts of calculating a download rate based at least in part on network conditions as measured during the downloading of the first set of portions of the requested file.

11. The computer readable medium of claim 10, wherein the first set of portions of the requested file are composed of Internet Protocol packets.

12. The computer readable medium of claim 10, further comprising instructions which, when stored in memory and executed by the processor causes the processor to perform acts of downloading into memory corresponding to the first extent, a second set of portions of the requested file.

13. The computer readable medium of claim 8, wherein the requested file corresponds to at least one of a video file, an audio file, an image file, or large structured document having multiple portions.

14. The computer readable medium of claim 8, wherein a calculated time period to delay before starting display of the requested file is zero or non-zero.

15. A system to implement prefetching in a virtual file system that accesses a requested file over a network, the system comprising:
a storage medium having stored thereon a sequence of instructions;
and a processor or processors that execute the instructions to cause the processor or processors to perform a set of acts, the acts comprising,
calculating a first extent of a first window, the first extent determined by at least a download starting time, a set of network conditions, a size of the requested file and a consumption rate;
calculating an initial second extent of a second window, the initial second extent determined by at least the download starting time, the set of network conditions, the size of the requested file and the consumption rate;
determining a delay time period to delay before starting display of the requested file;
recalculating the first extent and recalculating the second extent based at least on the delay time period;
downloading into memory corresponding to the first extent, a first set of portions of the requested file; and
displaying, after the delay time period, at least some of the first set of portions of the requested file that was downloaded into memory in a file management application.

16. The system of claim 15, further comprising instructions for determining whether the requested file exists in a local cache.

17. The system of claim 16, further comprising instructions for calculating a download rate based at least in part on network conditions as measured during the downloading of the first set of portions of the requested file.

18. The system of claim 17, wherein the first set of portions of the requested file are composed of Internet Protocol packets.

19. The system of claim 17, further comprising instructions for downloading into memory corresponding to the first extent, a second set of portions of the requested file.

20. The system of claim 15, wherein the requested file corresponds to at least one of a video file, an audio file, an image file, or large structured document having multiple portions.

* * * * *